(12) United States Patent
Sugaya et al.

(10) Patent No.: US 7,804,804 B2
(45) Date of Patent: Sep. 28, 2010

(54) WIRELESS COMMUNICATION SYSTEM, WIRELESS COMMUNICATION APPARATUS, WIRELESS COMMUNICATION METHOD, AND COMPUTER PROGRAM

(75) Inventors: Shigeru Sugaya, Kanagawa (JP); Mitsuhiro Suzuki, Chiba (JP)

(73) Assignee: Sony Corporation, Tokyo (JP)

( * ) Notice: Subject to any disclaimer, the term of this patent is extended or adjusted under 35 U.S.C. 154(b) by 719 days.

(21) Appl. No.: 11/430,237

(22) Filed: May 9, 2006

(65) Prior Publication Data
US 2006/0268800 A1 Nov. 30, 2006

(30) Foreign Application Priority Data
May 10, 2005 (JP) ............................. 2005-137859

(51) Int. Cl.
H04W 4/00 (2009.01)
H04J 3/00 (2006.01)
H04B 7/212 (2006.01)

(52) U.S. Cl. .................. 370/338; 370/328; 370/345; 370/347

(58) Field of Classification Search ............... 370/338, 370/328, 345, 347, 310, 277; 455/434, 443, 455/435.1, 432.1
See application file for complete search history.

(56) References Cited

U.S. PATENT DOCUMENTS

| | | | | |
|---|---|---|---|---|
| 2004/0141487 A1* | 7/2004 | Lee | ............................. | 370/338 |
| 2005/0030929 A1* | 2/2005 | Swier et al. | .................. | 370/338 |
| 2005/0064818 A1* | 3/2005 | Assarsson et al. | ........... | 455/41.2 |
| 2005/0128988 A1* | 6/2005 | Simpson et al. | .............. | 370/338 |
| 2005/0152305 A1* | 7/2005 | Ji et al. | ......................... | 370/328 |
| 2005/0249173 A1* | 11/2005 | Salokannel et al. | .......... | 370/338 |
| 2008/0259895 A1* | 10/2008 | Habetha et al. | .............. | 370/345 |

FOREIGN PATENT DOCUMENTS

| | | |
|---|---|---|
| JP | 2004-187001 | 7/2004 |
| JP | 2004-228926 | 8/2004 |

* cited by examiner

Primary Examiner—Huy Phan
Assistant Examiner—Kathy Wang-Hurst
(74) Attorney, Agent, or Firm—Finnegan, Henderson, Farabow, Garrett & Dunner, L.L.P.

(57) ABSTRACT

In network groups adjacent to each other constructed by communication apparatuses notifying beacons, the communication apparatuses can exchange necessary data between themselves, avoiding interference. Communication stations in a group set one beacon period to operate the network group. A communication station in the group acquires a beacon period and a reservation period of an adjacent group, sets its own reservation period avoiding the acquired beacon period and reservation period, and as necessary, enters the adjacent group to exchange necessary data. A device shared by a plurality of users does not belong to any group, and a communication apparatus in a different group temporarily enters the beacon period as necessary to exchange data.

15 Claims, 16 Drawing Sheets

FIG. 4

COMMUNICATION APPARATUS #8
B #3-4

COMMUNICATION APPARATUS #7
B #3-3

COMMUNICATION APPARATUS #6
B #3-2

COMMUNICATION APPARATUS #5
B #3-1

COMMUNICATION APPARATUS #4
B #2-1

COMMUNICATION APPARATUS #3
B #1-3

COMMUNICATION APPARATUS #2
B #1-2

COMMUNICATION APPARATUS #1
B #1-1

SUPERFRAME PERIOD

FIG. 7

| MAC HEADER INFORMATION | | | | H C S | BEACON PAYLOAD INFORMATION | | | | | | | F C S |
|---|---|---|---|---|---|---|---|---|---|---|---|---|
| FRAME CONTROL INFOR- MATION | DESTI- NATION INFOR- MATION | SENDER INFOR- MATION | SEQUENCE CONTROL INFORMATION | ACCESS CONTROL INFOR- MATION | | BEACON- SPECIFIC INFOR- MATION | BEACON PERIOD USE STATE | CAPA- BILITY INFOR- MATION | TRANS- MISSION INDICA- TION | USABLE MAS INFORMATION | RESER- VATION MAS INFOR- MATION | CONNEC- TION REQUEST | CONNEC- TION ACCEPT- ANCE/ REJEC- TION | ... |

FIG. 8

| APPLICATION IDENTIFIER | CONNECTION PROTOCOL IDENTIFIER | INTERFACE IDENTIFIER | MANUFACTURER IDENTIFIER | VENDOR IDENTIFIER | PRODUCT NAME IDENTIFIER | SERIAL NUMBER IDENTIFIER |

WIRELESS COMMUNICATION SYSTEM, WIRELESS COMMUNICATION APPARATUS, WIRELESS COMMUNICATION METHOD, AND COMPUTER PROGRAM

CROSS REFERENCES TO RELATED APPLICATIONS

The present invention contains subject matter related to Japanese Patent Application JP2005-137859 filed in the Japanese Patent Office on May 10, 2005, the entire contents of which being incorporated herein by reference.

BACKGROUND OF THE INVENTION

1. Field of the Invention

The present invention relates to a wireless communication system, a wireless communication apparatus, a wireless communication method, and a computer program such as a wireless LAN (Local Area Network) or PAN (Personal Area Network) for communicating between a plurality of wireless stations. In particular, the invention relates to a wireless communication system, a wireless communication apparatus, a wireless communication method, and a computer program for allowing communication apparatuses to operate in an autonomous distributed manner without the relationship between a controlling station and a controlled station.

More specifically, the invention relates to a wireless communication system, a wireless communication apparatus, a wireless communication method, and a computer program by which at least a part of the communication apparatuses notify a beacon containing information concerning a network so that adjacent communication apparatuses identify each other to operate an autonomous distributed network. In particular, the invention relates to a wireless communication system, a wireless communication apparatus, a wireless communication method, and a computer program for forming a network while ensuring security and for exchanging necessary data, avoiding interference, between communication apparatuses of adjacent network groups configured by notifying respective beacons.

2. Description of the Related Art

Wireless networks draw attention as systems that free users from cable wiring in traditional wire communication schemes. Canonical standards for the wireless networks include IEEE (the Institute of Electrical and Electronics Engineers) 802.11.

According to a general method of constructing a local area network using a wireless technology, there is provided one apparatus called an "access point" or a "coordinator" functioning as a control station inside the area. The network is formed under overall control of the control station. For this kind of wireless network there is broadly used an access control method based on band reservations, in which communication apparatuses synchronize with each other through the mediation of the access point. In other words, when a given communication apparatus transmits information, a band needed for the information transmission is firstly reserved through the access point so that the communication apparatus can use a transmission path without conflict with the information transmission by the other communication apparatuses.

In the case of performing asynchronous communication between transmitting and receiving communication apparatuses in a wireless communication system having an access point, wireless communication always needs to be routed through the access point, thereby causing a problem of a significant decrease in utilization efficiency of a transmission path. For this reason, as another method of constructing a wireless network, there is proposed a so called "ad-hoc communication" for directly performing asynchronous communication between communication stations operating autonomously. Particularly, in a small-scale wireless network composed of a relatively small number of clients that locate close to each other, it is considered that such ad-hoc communication is suitable because any terminal can directly perform asynchronous wireless communication without using a particular access point.

An ad-hoc wireless communication system has no central control station. Accordingly, this system is suited for constructing a home network composed of household electric appliances. The ad-hoc network has several features. For example, if one apparatus fails or is powered off, the routing is automatically changed, making the network strong against crash. Since a packet is hopped more than once between mobile stations, data can be transferred to a relatively distant destination with a high data rate maintained. There are known various development examples about the ad-hoc system (e.g., see non-patent document 1).

For example, communication apparatuses that perform autonomous network operations transmit the respective beacons at every predetermined period, and a communication apparatus that intends a new entry receives beacon signals concentratedly by a scan operation over the predetermined period and recognizes a communication apparatus that exists within the wireless coverage. According to this method, since adjacent communication apparatuses can set beacon transmission timings in a random fashion, it is possible to suitably configure an autonomous distributed ad-hoc network by communication apparatuses that operate on an equal basis (e.g., see patent document 1).

If communication apparatuses set each individual beacon signal timing in a predetermined period, the beacon transmission positions of communication apparatuses in the same network group are distributed in arbitrary positions, thereby making it difficult to grasp the states of adjacent communication apparatuses. This is because a scan operation over a whole predetermined period is required to detect a beacon transmission from a new communication apparatus. While a scan operation over a predetermined period makes it possible to grasp the states of adjacent communication apparatuses, frequent scan operations increase power consumption. On the contrary, the longer the interval between scan operations, the less information concerning the adjacent state is obtained.

For this reason, in the latest specification concerning a multiband OFDM system (MBOA-MAC), a study is being made on a method by which the communication apparatuses of the same network group define a specified superframe period, specify a beacon period shared by the communication apparatuses using a part of the superframe period, transmit and receive beacons among themselves in this beacon period, and thereby manage the network (e.g., see non-patent document 2). According to this method, the beacon transmission timings of the communication apparatuses exist integratedly at a specified time in a superframe period so that the communication apparatuses can easily grasp the states of adjacent communication apparatuses.

In the case where a communication apparatus that intends a new entry detects a plurality of beacon periods, merging the beacon periods into one of them enables the utilization of the above feature. In MBOA-MAC, a study is being made on a method for performing management by merging into one beacon period to form the same beacon period in the case of detecting a communication apparatus of a different beacon period. For example, a user of a beacon slot located in a rearward position utilizes a forward beacons lot of no beacon transmission, thereby enabling a beacon period to be a minimum necessary period. Alternatively, communication apparatuses specified by users constitute a network group having one beacon period and thereby can operate independently of communication apparatuses in another network group of a different beacon period.

In general, a network is formed among apparatuses specified by users that have gone through predetermined authentication processes, as a method for forming a network group among adjacent communication apparatuses.

In the case where there exists an access point in a network, there is employed a method of link management for making a one-to-one connection between the access point and a terminal of communication permission. For example, in a wireless LAN device in conformity with IEEE802.11, the same SSID (Service Set Identifier) set in a communication apparatus to be an access point is also registered in a communication apparatus to be a terminal by a user, thus performing an authentication process (e.g., see patent document 2).

On the other hand, in the case of an ad-hoc system having no access point disposed, it is necessary to exchange data between communication apparatuses specified by users that have gone through predetermined authentication processes. In an ad-hoc network, while communication apparatuses can constitute a network without being aware of a network group, there is a possible method of making settings such that data communication is valid only among communication apparatuses of the network.

In the network configuration method for setting a beacon period, in the case of performing data communication among communication apparatuses that have already formed authentication relationships, it becomes easier to establish one beacon period by exchanging authentication information beforehand. Further, it is possible to enter a network specified by a user based on information obtained by a prior authentication process, thereby reducing security problems in the network.

The present inventors consider that in an autonomous distributed network, it is necessary to equally manage the existence of communication apparatuses of another network group that have not gone through authentication processes as well as communication apparatuses of their network group. However, in a communication environment where ad-hoc networks are adjacent to each other in which communication apparatuses set each individual beacon period and operate independently and equally, if a communication apparatus communicates with any communication apparatus in a random fashion and on an equal basis without authentication relationships with other network groups, the risk of occurrence of a security problem becomes high.

In a configuration where a scan operation is activated by transmitting a scan request to another communication apparatus, it is difficult to eliminate a risk that a malicious communication apparatus transmits more scan requests than are necessary.

It is difficult to detect a communication apparatus operating with a different beacon period, using a method by which communication apparatuses transmit and receive beacons between themselves in a common beacon period specified by the communication apparatuses. A method being studied as the current MBOA-MAC Layer specification does not permit entry into a different beacon period, thereby preventing reservation information concerning a communication apparatus of a different beacon period from being propagated.

For this reason, if communication apparatuses operating with different beacon periods spatially overlap each other in wireless coverage, there is a problem that a conflict arises between timings of reservation communications so that the throughput of data communication decreases.

Although there is a possible method of operation merging different beacon periods into one in the case of detecting a communication apparatus operating with a different beacon period (described above), it is assumed that it is difficult to merge different beacon periods into one in a communication environment changing drastically. For example, in a commuter train or a crowd, innumerable mobile networks always overlap one another in wireless coverage and the merger of beacon periods occurs frequently, thereby making it rather difficult to merge different beacon periods into one.

In the method of operation merging different beacon periods of communication apparatuses into one, a communication apparatus communicates with any communication apparatus in a random fashion and on an equal basis, thereby increasing the risk of occurrence of a security problem.

In the case of using a vacant forward beacon slot during a beacon period (described above), separating one beacon which different beacon periods have been merged into brings about a plurality of different networks having the same beacon start position, that is, networks that operate with timings forwarded in the same way. In such a case, recombining networks in which vacant forward beacons are used during the same beacon period causes a conflict of beacon slots with certainty because only forwarder beacon slots are used.

In summary, in a wireless communication system that shares one beacon period in the same network group, in the case where a communication apparatus detects a plurality of beacon periods after power-on, the communication apparatus activates processing for merging the beacon periods of two or more network groups operating independently into one beacon period. Accordingly, reconfiguration is required for an existing network that has been operating with stability, thereby making it difficult to perform stable network operation.

[Patent document 1] Japanese Patent Application Laid-Open No. 2004-228926, paragraph number 0064, FIG. 4

[Patent document 2] Japanese Patent Application Laid-Open No. 2004-187001, paragraph number 0005

[Non-patent document 1] "Ad Hoc Mobile Wireless Network" by C. K. Tho (Prentice Hall PTR)

[Non-patent document 2] MBOA-MAC Spec. v090

SUMMARY OF THE INVENTION

It is desirable to provide a wireless communication system, a wireless communication apparatus, a wireless communication method, and a computer program excellent at being able to form a network while ensuring security and exchange necessary data, avoiding interference, between communication apparatuses of adjacent network groups configured by notifying respective beacons when at least a part of the communication apparatuses notify a beacon containing information concerning a network so that adjacent communication apparatuses identify each other to operate an autonomous distributed network.

Further, it is desirable to provide a wireless communication system, a wireless communication apparatus, a wireless communication method, and a computer program excellent at being able to form a network while ensuring security and exchange necessary data, avoiding interference with each other, between communication apparatuses of adjacent network groups in a wireless communication environment where one beacon period is set at every predetermined period in the same network group and at least a part of the communication apparatuses in the network group notify a beacon containing information concerning a network so as to form the network group.

Furthermore, it is desirable to provide a wireless communication system, a wireless communication apparatus, a wireless communication method, and a computer program excellent at being able to exchange data as necessary between different network groups while maintaining stable network operation even in the case of detecting a different beacon period due to the emergence of a new communication apparatus or the like in a wireless communication environment where one beacon period is set at every predetermined period in the same network group.

Furthermore, it is desirable to provide a wireless communication system, a wireless communication apparatus, a wireless communication method, and a computer program excellent at being able to exchange data as necessary between different network groups while maintaining stable network operation and ensuring security between authenticated communication apparatuses in a wireless communication environment where one beacon period is set at every predetermined period in the same network group.

Furthermore, it is desirable to provide a wireless communication system, a wireless communication apparatus, a wireless communication method, and a computer program in which a plurality of users of different network groups share a communication apparatus connected with a specific device and exchange data as necessary with the communication apparatus while ensuring security between authenticated communication apparatuses in a wireless communication environment where one beacon period is set at every predetermined period in the same network group.

According to a first embodiment of the present invention, there is provided a wireless communication system in which one beacon period is set at every predetermined period in a same network group and at least a part of communication apparatuses in the network group notify a beacon containing information concerning a network so as to form the network group. The wireless communication system includes a communication apparatus which searches for an adjacent existing network group by a beacon scan and enters each network group by transmitting a beacon signal during each beacon period of two or more network groups having different beacon periods.

In this context, the term "system" signifies a logical set of a plurality of apparatuses (or function modules to implement a specific function) regardless of whether or not the apparatuses or function modules are contained in a single enclosure (the same applies hereinafter).

In the case of constructing a wireless network, there may be a method for forming a network under overall control of a particular control station and an ad-hoc method by which communication apparatuses operate in an autonomous distributed manner without a control station disposed. The invention adopts the latter method, that is, the ad-hoc communication for directly performing asynchronous wireless communication between arbitrary terminals.

In an ad-hoc wireless communication system, there is employed a network configuration method by which communication apparatuses transmit the respective beacons at every predetermined period, and a communication apparatus that intends a new entry concentratedly receives beacon signals by a scan operation over the predetermined period and recognizes a communication apparatus that exists within the wireless coverage. The invention adopts a beacon transmission method for setting one beacon period at every predetermined period in the same network group, thereby making it easier to grasp the states of adjacent communication apparatuses and simplifying network management.

However, in a system that sets a beacon period for each network group, if communication apparatuses operating with different beacon periods spatially overlap each other in wireless coverage, there is a problem that a conflict arises between timings of reservation communications so that the throughput of data communication decreases.

Although there is a possible method of operation merging different beacon periods into one in the case of detecting a communication apparatus operating with a different beacon period, the merger of beacon periods occurs frequently in an environment where innumerable mobile networks always overlap one another in wireless coverage, thereby making it rather difficult to merge different beacon periods into one. Further, separating one beacon which different beacon periods have been merged into is prone to provoke a conflict of beacon slots between network groups, thereby causing unstable network operation.

In the method of operation merging different beacon periods of communication apparatuses into one, a communication apparatus communicates with any communication apparatus in a random fashion and on an equal basis, thereby increasing the risk of occurrence of a security problem.

A wireless communication system according to an embodiment of the invention allows a communication apparatus to enter a plurality of beacon periods, thus permitting the presence of different beacon periods. Thereby, it is possible to stabilize network operation without combining and separating networks frequently.

Further, in the wireless communication system according to the embodiment of the invention, even in the case of detecting a plurality of network groups having different beacon periods due to the emergence of a new communication apparatus, only device-authenticated communication apparatuses that a user intends are allowed to form a group so as to set one beacon period. Therefore, it is possible to ensure security with the merger of beacon periods, i.e., the combination of network groups.

In such a case where the combination of network groups is constrained even though another beacon period is detected, there may occur a need to exchange data between communication apparatuses of different network groups in a communication environment where two or more network groups having different beacon periods overlap each other.

A wireless communication apparatus according to an embodiment of the invention is allowed to enter each network group by transmitting a beacon signal during each beacon period of two or more network groups having different beacon periods.

The communication apparatus searches for an adjacent existing network group by a beacon scan. Further, the communication apparatus transmits a beacon signal during a beacon period of another network group having a different beacon period so as to enter the network group, thereby making it possible to exchange data desired between network groups. Furthermore, the communication apparatus can set a reservation period in the network group that the communication apparatus has entered, by acquiring a beacon period and a reservation period in an adjacent existing network group and avoiding the acquired beacon period and reservation period.

For example, a communication apparatus connected with a device shared by a plurality of users such as a printer does not belong to any network group, and communication apparatuses in network groups can exchange data as necessary. Further, the communication apparatus makes a close connection to an authenticated communication apparatus in the same group and makes a loose connection to a communication apparatus in the other groups. Therefore, the adoption of a network connection method of a shared device does not cause security threat to a network group.

According to a second embodiment of the invention, there is provided a computer program described in computer-readable form so as to allow a computer system to execute processing for performing communication operation in a wireless communication environment where one beacon period is set at every predetermined period in a same network group and at least a part of communication apparatuses in the network group notify a beacon containing information concerning a network so as to form the network group. The computer program includes the steps of setting one beacon between communication apparatuses in a network group, searching for an adjacent existing network group by a beacon scan, attempting to enter another network group of a different beacon period by transmitting a beacon signal during a beacon period of the network group, controlling a connection with a new communication apparatus at the time of receiving a beacon signal from the new communication apparatus during its own beacon period, and merging into one network group by setting one beacon period with a device-authenticated communication apparatus that a user intends at the time of detecting a communication apparatus operating with a different beacon period.

The computer program according to the second embodiment of the invention is defined as a computer program described in a computer-readable form so as to implement specified processes on a computer system. In other words, when the computer program according to the second embodiment of the invention is installed in a computer system, the computer system exhibits cooperative effects and operates as a wireless communication apparatus. A plurality of such wireless communication apparatuses can be activated to construct a wireless network. In this manner, it is possible to provide effects similar to those of the wireless communication system according to the first embodiment of the invention.

According to an embodiment of the invention, it is possible to stabilize network operation while permitting the presence of different beacon periods by allowing a communication apparatus to enter a plurality of beacon periods in a wireless communication environment where one beacon period is set at every predetermined period in the same network group.

According to another embodiment of the invention, it is possible to exchange data as necessary between communication apparatuses in network groups having different beacon periods without merging the different beacon periods of the network groups into one.

According to another embodiment of the invention, it is possible to configure a secure network system because a network group is formed only by communication apparatuses that have gone through authentication processes specified by users even in the case where network groups having different beacon periods spatially overlap each other in wireless coverage. While a communication apparatus is permitted to enter a plurality of beacon periods, the communication apparatus makes a close connection to an authenticated communication apparatus in the same group and makes a loose connection to a communication apparatus in the other groups, thus preventing security threat to a network group.

According to another embodiment of the invention, it is possible to control the acceptance/rejection of a network setting in accordance with an application of a device connected to a communication apparatus. For example, a communication apparatus connected with a device shared by a plurality of users such as a printer does not belong to any network group and sets a beacon period different from any beacon period of adjacent network groups. In such a case, communication apparatuses of the adjacent network groups transmit beacons in a beacon period of the communication apparatus, thereby making it possible to exchange data. That is, a device shared by a plurality of users is not incorporated in a specific user's network group, thereby excluding a network configuration that is advantageous to some user so that the shared device can be handled equally among the users.

In a wireless communication system according to an embodiment of the invention, a communication apparatus can grasp the existence of an adjacent network group, i.e., a communication apparatus operating with a different beacon period, by performing a scan operation with an arbitrary timing. Further, at the time of exchanging data with a communication apparatus of another network group, it is possible to connect to the network group only when necessary, by suitably transmitting a beacon signal in the beacon period to enter the group.

Further, a communication apparatus can grasp a reservation period of another network group by managing reservation information described in a beacon signal. That is, it is possible to achieve data communication that enhances throughput by avoiding reservations and overlaps in the network group of the communication apparatus and using a band of another network group.

On the other hand, if the communication apparatus does not use a detected different beacon period for its own communication, it is possible not to disturb beacon transmission/reception by a communication apparatus at the other end.

These and other features and advantages of the invention will be apparent from the following more particular description of preferred embodiments of the invention, as illustrated in the accompanying drawings.

BRIEF DESCRIPTION OF THE DRAWINGS

FIG. 4 is a diagram exemplifying the arrangement of beacon transmission positions of communication apparatuses in a superframe period.

FIG. 7 is an illustration exemplifying the structure of a beacon frame used in an autonomous distributed network according to an embodiment of the invention.

FIG. 8 is an illustration exemplifying the structure of application attribute information.

DESCRIPTION OF THE PREFERRED EMBODIMENTS

Hereinafter, an embodiment of the present invention will be described in detail with reference to the accompanying drawings.

A transmission path for communications currently assumed in the present invention is wireless, and a network is built among a plurality of communication stations. A wireless network system according to an embodiment of the present invention has an autonomous distributed system configuration where a control station is not disposed, and uses a distributed reservation protocol (DRP) to provide transmission control by effectively using channel resources. Further, communication stations can transmit information following an access procedure based on CSMA (Carrier Sense Multiple Access) as necessary by priority transmission control based on a predetermined access category in a time period that is not used by the distributed reservation protocol (DRP).

In the wireless communication system according to this embodiment, one beacon period is set in every predetermined period (hereinafter referred to as a "superframe") in the same network group, and at least some communication apparatuses in the network group notify beacons containing information concerning the network by using the beacon period, thus operating the network group. Processes in respective communication stations to be described are basically performed in all communication stations entering the network. Depending on cases, however, all communication stations constituting the network do not perform the processes to be described below.

Figure 1:
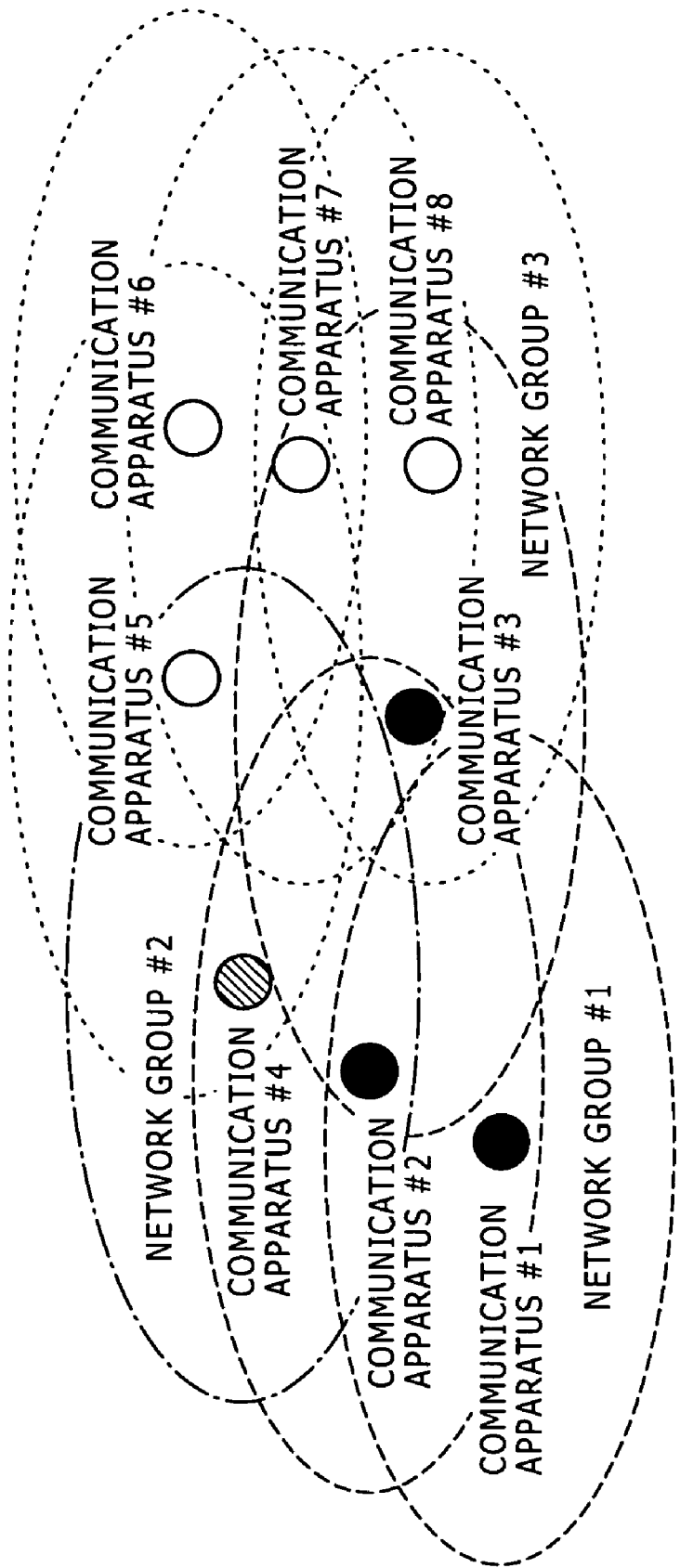
FIG. 1 is an illustration schematically showing the configuration of an autonomous distributed network environment according to an embodiment of the present invention.

FIG. 1 schematically shows the configuration of an autonomous distributed network environment according to the embodiment of the present invention. The network in FIG. 1 disposes a plurality of wireless communication apparatuses #1 through #8 in the space. Adjacent communication apparatuses can directly communicate with each other.

In FIG. 1, the communication apparatus #1 can directly communicate with the adjacent communication apparatus #2 within the wireless coverage (within a dashed-line ellipse centering on the communication apparatus #1), but cannot directly communicate with the communication apparatuses #3 to #8 beyond the coverage.

The communication apparatus #2 can directly communicate with the adjacent communication apparatuses #1, #3, and #4 within the wireless coverage (within a dashed-line ellipse centering on the communication apparatus #2), but cannot directly communicate with the communication apparatuses #5 to #8 beyond the coverage.

The communication apparatus #3 can directly communicate with the adjacent communication apparatuses #2, #7, and #8 within the wireless coverage (within a dashed-line ellipse centering on the communication apparatus #3), but cannot directly communicate with the communication apparatuses #1, #4, #5, and #6 beyond the coverage.

The communication apparatus #4 can directly communicate with the adjacent communication apparatuses #2 and #5 within the wireless coverage (within a dashed-line ellipse centering on the communication apparatus #4), but cannot directly communicate with the communication apparatuses #1, #3, #6, #7, and #8 beyond the coverage.

The communication apparatus #5 can directly communicate with the adjacent communication apparatuses #4, #6, and #7 within the wireless coverage (within a dashed-line ellipse centering on the communication apparatus #5), but cannot directly communicate with the communication apparatuses #1, #2, #3, and #8 beyond the coverage.

The communication apparatus #6 can directly communicate with the adjacent communication apparatuses #5 and #7 within the wireless coverage (within a dashed-line ellipse centering on the communication apparatus #6), but cannot directly communicate with the communication apparatuses #1, #2, #3, #4, and #8 beyond the coverage.

The communication apparatus #7 can directly communicate with the adjacent communication apparatuses #3, #5, #6, and #8 within the wireless coverage (within a dashed-line ellipse centering on the communication apparatus #7), but cannot directly communicate with the communication apparatuses #1, #2, and #4 beyond the coverage.

The communication apparatus #8 can directly communicate with the adjacent communication apparatuses #3 and #7 within the wireless coverage (within a dashed-line ellipse centering on the communication apparatus #8), but cannot directly communicate with the communication apparatuses #1, #2, #4, #5, and #6 beyond the coverage.

In the autonomous distributed network environment shown in FIG. 1, the communication apparatuses #1, #2, and #3 constitute a first network group. The communication apparatuses #4 alone constitutes a second network group. The communication apparatuses #5, #6, #7, and #8 constitute a third network group. Further, the network groups are constituted only by the communication apparatuses that have gone through authentication processes specified by users, thereby making it possible to ensure security in units of network groups while communicating with any communication apparatus in a random fashion and on an equal basis.

In the autonomous distributed network according to this embodiment, each network is operated in units of predetermined periods referred to as "superframes". Further, the network groups are provided with each individual beacon period.

Figure 2:
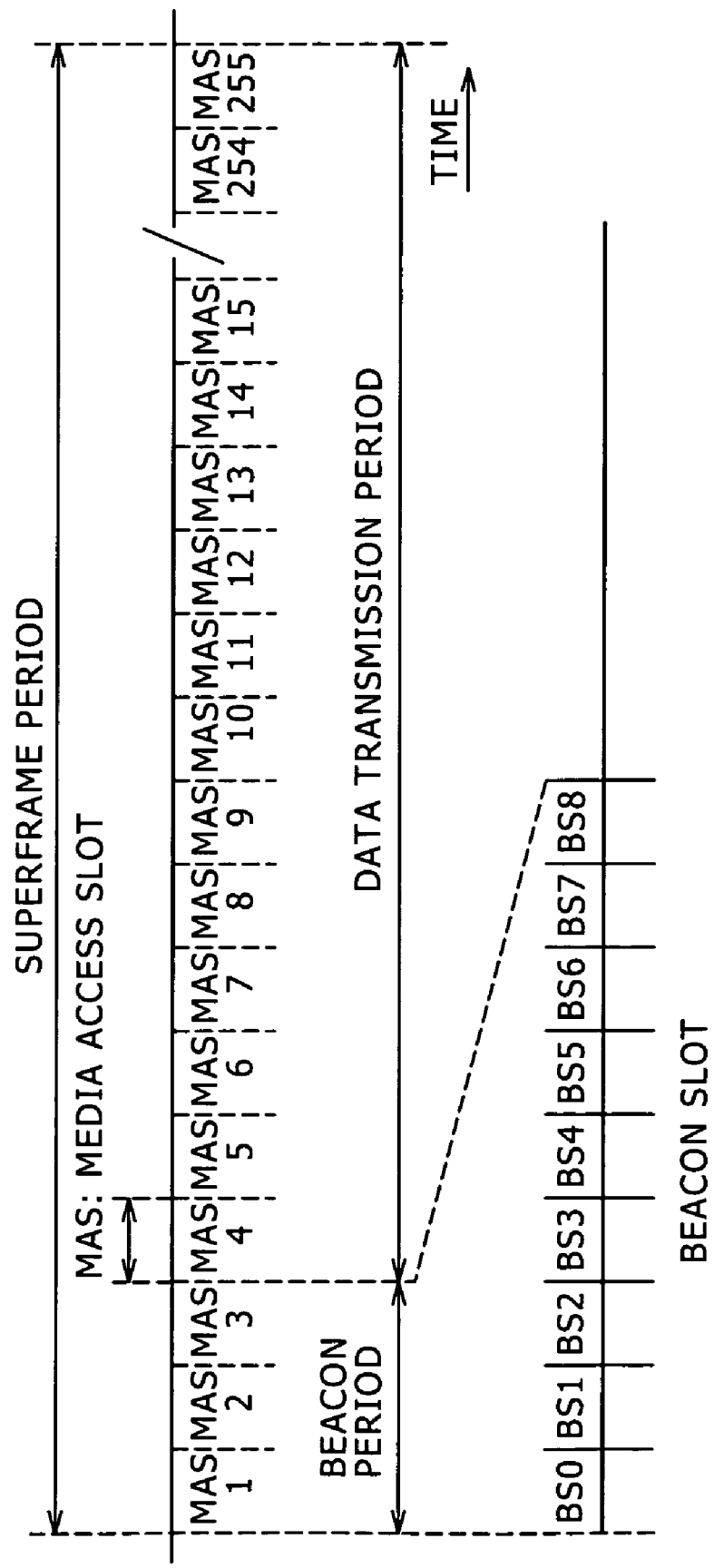
FIG. 2 is a diagram exemplifying the structure of a superframe.

FIG. 2 exemplifies the structure of a superframe. In the example of FIG. 2, one superframe is divided into a total of 256 time slots (media access slots: MAS) of MAS-0 to MAS-255.

One superframe includes a beacon period as a management period of a network group over which communication apparatuses notify beacon signals to each other and a data transmission period which is used as a band for data transmission.

In this embodiment, a beacon period in a superframe is arranged for each network group.

The beacon period is further subdivided into a plurality of beacon slots. Each communication apparatus acquires one of the beacon slots in the beacon period for its own use, notifies a beacon signal, and exchanges network parameters with adjacent communication stations, thereby making it possible to operate a network.

In the example of FIG. 2, three media access slots of MAS-0 to MAS-2 are set in the beacon period. Further, nine beacon slots of BS0 to BS8 are set at predetermined intervals in the beacon period. One beacon slot enables one beacon transmission timing. Accordingly, in the structure of the beacon period shown in FIG. 2, it is possible to accommodate a maximum of 9 communication apparatuses in a network group.

In the superframe structure and the beacon period structure as shown in FIG. 2, communication apparatuses constituting one network group notify unused beacon slots to adjacent communication apparatuses among themselves during a beacon period in a superframe so that a communication apparatus can select a beacon slot for its own use.

Figure 3:
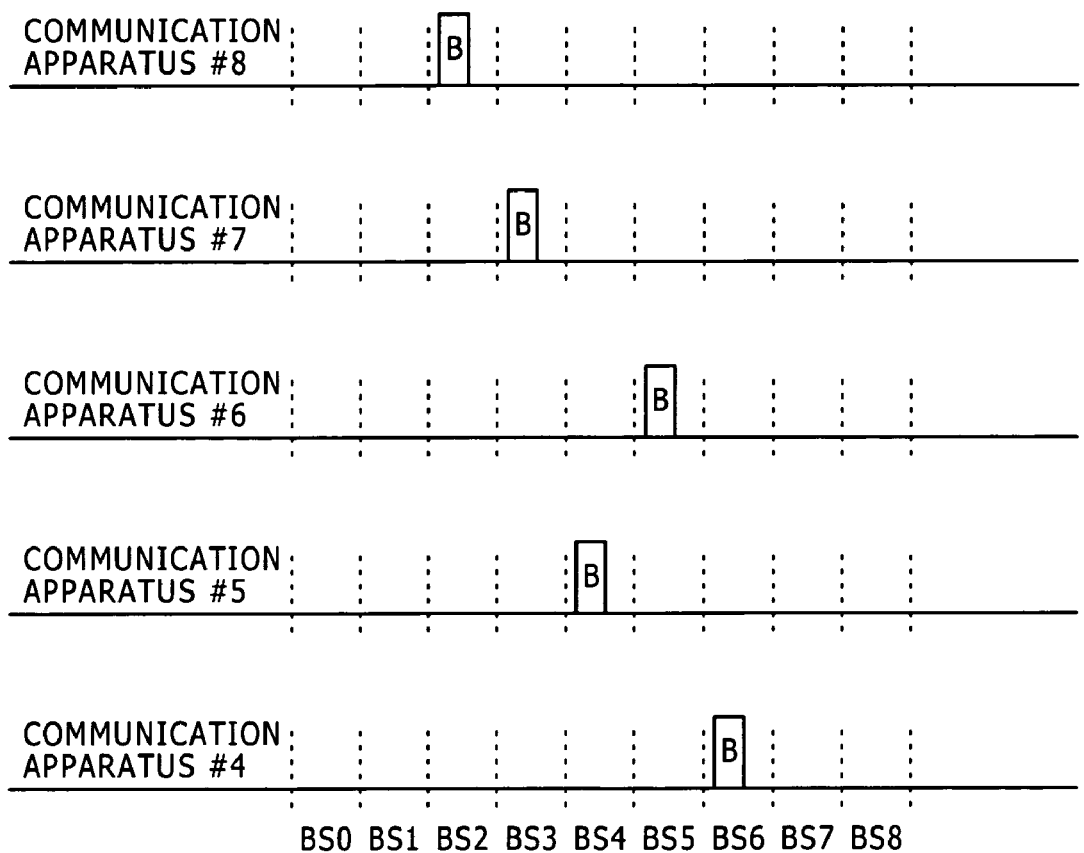
FIG. 3 is a diagram exemplifying the use setting of beacon slots of communication apparatuses.

FIG. 3 exemplifies the use setting of beacon slots of communication apparatuses. In the example of FIG. 3, the communication apparatuses in the second network group and the third network group shown in FIG. 1 have a common beacon period among a plurality of adjacent communication apparatuses irrespective of the network groups.

The communication apparatus #4 which is the sole member in the second network group transmits its own beacon signal with a beacon slot 6 (BS6).

On the other hand, in the third network group, the communication apparatus #5 transmits its own beacon signal with a beacon slot 4 (BS4). The communication apparatus #6 transmits its own beacon signal with a beacon slot 5 (BS5). The communication apparatus #7 transmits its own beacon signal with a beacon slot 3 (BS3). The communication apparatus #8 transmits its own beacon signal with a beacon slot 2 (BS2).

Further, a beacon slot 7 (BS7) and a beacon slot 8 (BS8) that are not used by any member of the network groups are reserved for newly joining communication apparatuses. A beacon slot 7 (BS7) and a beacon slot 8 (BS8) are used for notification thereof.

In the past, methods for managing an ad-hoc network by notifying beacon signals include a method by which communication apparatuses set each individual beacon signal timing and transmit at every superframe period (e.g., see patent document 1) and a method by which communication apparatuses transmit and receive beacons among themselves in a beacon period set in a part of a superframe period in the same network group (e.g., see non-patent document 1).

FIG. 4 exemplifies the arrangement of beacon transmission positions of communication apparatuses in a superframe according to the former method. In the example of FIG. 4, each communication apparatus sets its own beacon transmission position in an autonomous distributed manner.

FIG. 4 shows an example of the relative arrangement of a superframe relative to the beacon transmission position of the communication apparatus #1 (network group #1-1). The beacon transmission position of the communication apparatus #2 (network group #1-2) is at ½ of the superframe. The beacon transmission position of the communication apparatus #3 (network group #1-3) is at ¾ of the superframe. The beacon transmission position of the communication apparatus #4 (network group #2-1) is at ¼ of the superframe. The beacon transmission position of the communication apparatus #5 (network group #3-1) is at ⅞ of the superframe. The beacon transmission position of the communication apparatus #6 (network group #3-2) is at ⅜ of the superframe. The beacon transmission position of the communication apparatus #7 (network group #3-3) is at ⅛ of the superframe. The beacon transmission position of the communication apparatus #8 (network group #3-4) is at ⅝ of the superframe. The beacon transmission positions exist in the superframe in a distributed manner.

Such a superframe structure enables highly effective use in a mobile environment where arbitrary communication apparatuses straggle. However, in the case where a communication apparatus forms a network with specific communication apparatuses for operation, the communication apparatus needs to inquire all beacons in order to grasp the states of other communication apparatuses from beacon signals, that is, needs to scan over a superframe, thereby disadvantageously preventing it from operating with low power consumption.

Further, since a structure in which the communication apparatus inquires all beacons evenly allows the communication apparatus to access an arbitrary communication apparatus, it is considered that this structure is unsuitable for constructing a secure network.

Figure 5:
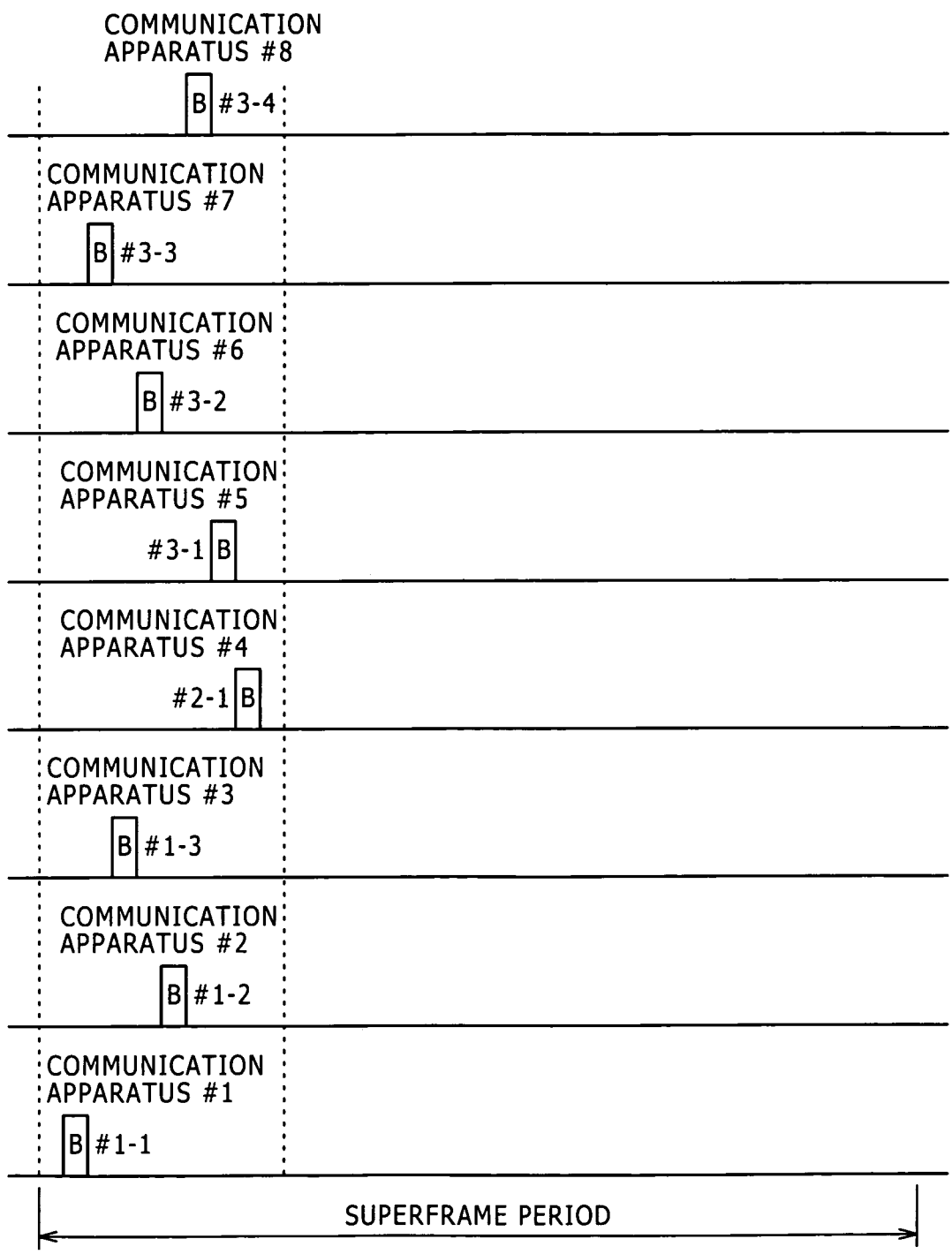
FIG. 5 is a diagram exemplifying the arrangement of beacon transmission positions of communication apparatuses in a superframe period.

FIG. 5 exemplifies the arrangement of beacon transmission positions of communication apparatuses in a superframe according to the latter method of setting a part of a superframe period to a beacon period in the same network group. In this case, each communication apparatus sets its own beacon transmission position in an autonomous distributed manner and shares the beacon period in accordance with the adjacent communication apparatuses.

In FIG. 5, the beacon transmission position of the communication apparatus #1 (network group #1-1) is set in beacon slot 1. The beacon transmission position of the communication apparatus #2 (network group #1-2) is set in beacon slot 5. The beacon transmission position of the communication apparatus #3 (network group #1-3) is set in beacon slot 3. The beacon transmission position of the communication apparatus #4 (network group #2-1) is set in beacon slot 8. The beacon transmission position of the communication apparatus #5 (network group #3-1) is set in beacon slot 7. The beacon transmission position of the communication apparatus #6 (network group #3-2) is set in beacon slot 4. The beacon transmission position of the communication apparatus #7 (network group #3-3) is set in beacon slot 2. The beacon transmission position of the communication apparatus #8 (network group #3-4) is set in beacon slot 6. The beacon transmission positions exist in the superframe in a distributed manner.

In the case where two or more network groups having different beacon periods in the superframe structure shown in FIG. 5 spatially overlap each other in wireless coverage, operating as one network requires processing for merging the beacon periods into one (e.g., merging one beacon period with the other beacon period); however, this causes a problem that the beacon period increases. Further, since a structure in which a communication apparatus can inquire a beacon of another network group on an equal basis allows the communication apparatus to access an arbitrary communication apparatus, it is considered that this structure is unsuitable for creating a secure network.

Further, in the case where different network groups move after merging the beacon periods into one, there is a possible method of utilizing a vacant forward beacon slot in the beacon period. However, since this is performed in the same beacon period, combining network groups together again causes a problem that there arises a conflict of beacon transmission with the same beacon slot.

Figure 6:
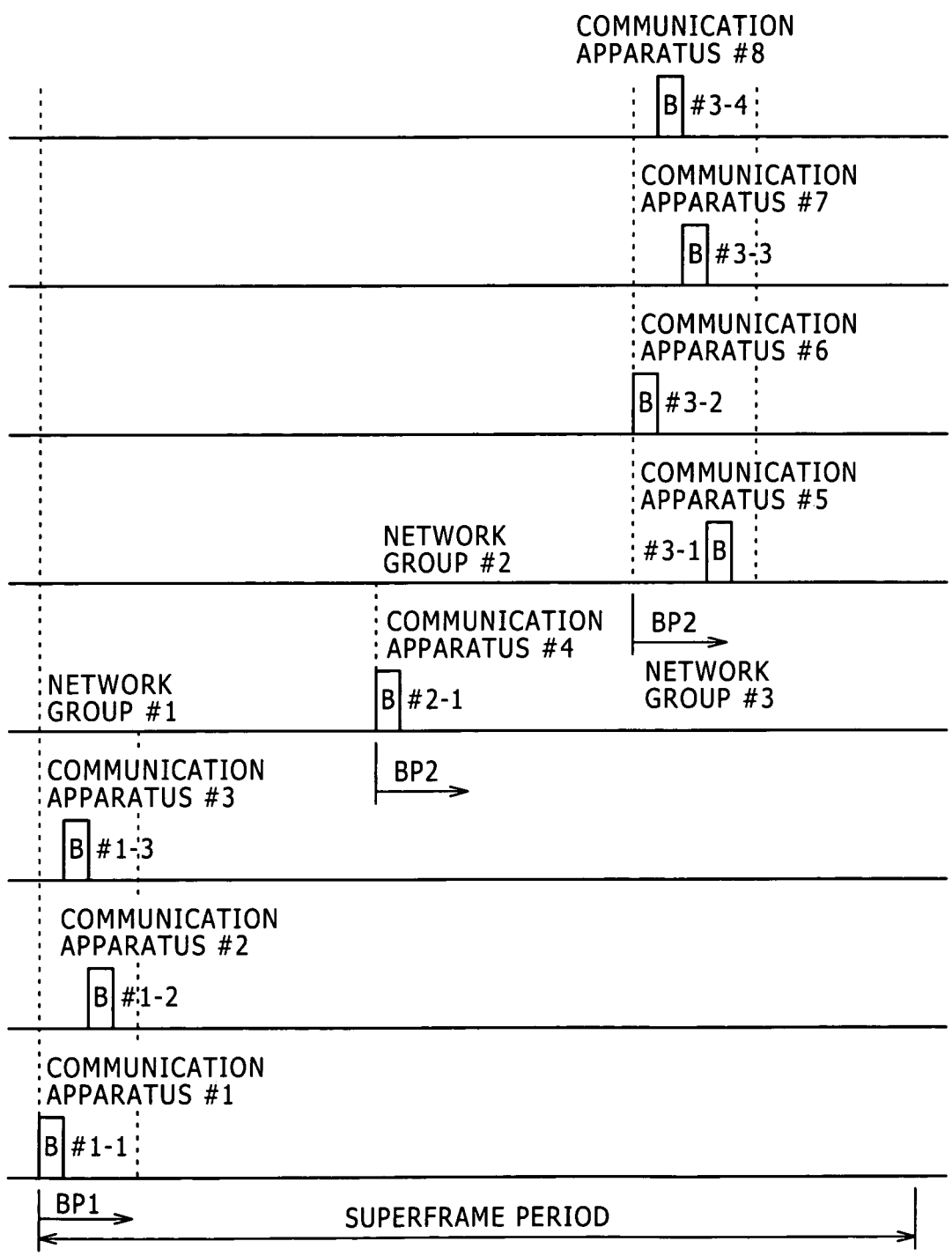
FIG. 6 is a diagram exemplifying the arrangement of beacon transmission positions in a superframe structure according to an embodiment of the invention.

FIG. 6 exemplifies the arrangement of beacon transmission positions in a superframe structure according to this embodiment of the invention, in comparison with FIG. 5 and FIG. 6. In the structure example of FIG. 6, a beacon period is common in a same network group, but different from that of another network group.

The communication apparatuses #1, #2, and #3 constituting the network group #1 set a common beacon period BP1. The sole communication apparatuses #4 constituting the network group #2 set an individual beacon period BP2. The communication apparatuses #5, #6, and #7 constituting the network group #3 set a common beacon period BP3. The network groups operate the respective networks.

Each network group manages the presence of reservation communication areas and the beacon periods of other network groups to avoid a conflict of communications.

The network groups are constituted only by the communication apparatuses that have gone through authentication processes specified by users. Thus, it is not merely because of spatially overlapping each other in wireless coverage that an operation for combining network groups (i.e., merging beacon periods) is activated.

With the superframe structure shown in FIG. 6, communication apparatuses in their network group having frequent communications can perform stable network operation among themselves and make access to communication apparatuses in other network groups as necessary. That is, each communication apparatus can control the acceptance/rejection of a network setting in accordance with an application of a device connected thereto.

For example, even though the communication apparatus #4 connected with an application device shared by a plurality of users such as a printer spatially overlaps with the adjacent communication apparatuses #1 and #3 in wireless coverage, the communication apparatus #4 does not combine with any network group. Instead, the communication apparatus #4 alone forms and operates the network group #2, setting an individual beacon period BP2 different therefrom. Communication apparatuses of the other network groups #1 and #3 transmit beacon signals in the beacon period BP2 of the communication apparatus #4, thereby making it possible to exchange data.

That is, a device shared by a plurality of users is not incorporated in a specific user's network group, thereby excluding a network configuration that is advantageous to some user so that the shared device can be handled equally among the users. While a communication apparatus is permitted to enter a plurality of beacon periods, the communication apparatus makes a close connection to an authenticated communication apparatus in the same group and makes a loose connection to a communication apparatus in the other groups, thus preventing security threat to a network group.

FIG. 7 exemplifies the structure of a beacon frame used in an autonomous distributed network according to this embodiment. A beacon frame shown in FIG. 7 is transmitted from each communication apparatus in a beacon period as a management period of a superframe and received, thereby exchanging parameters between adjacent communication apparatuses.

As shown in FIG. 7, the beacon frame includes MAC header information, header check sequence (HCS), beacon payload information, and frame check sequence (FCS).

The MAC header information is structured of frame control information, destination information which is a destination address, sender information which is a sender address, sequence control information for performing sequence management such as a sequence number, and access control information in which a parameter necessary for access control is described.

The beacon payload information is structured of beacon-specific information which is a parameter specific to a communication apparatus, a beacon period use state which indicates the use of a beacon slot, capability information which indicates the capacity of a communication apparatus, transmission indication which indicates the presence of transmission data in a destination communication apparatus, usable MAS information which indicates a MAS position usable in a beacon period, reservation MAS information which indicates a MAS position reserved, and the like. The reservation MAS information includes a reserved MAS position and address information of a sender that reserves and uses the MAS.

The beacon frame may be structured by adding or deleting some of these information elements as necessary. For example, information elements to be added or deleted include connection request information for making a connection request to another network group of a different beacon period and connection acceptance/rejection information for notifying a decision about whether or not to accept a connection request from another network group (described later).

As described above, in an autonomous distributed network according to this embodiment, a communication apparatus can control the acceptance/rejection of a network setting in accordance with an application of a device connected thereto. FIG. 8 exemplifies the structure of application attribute information. The application attribute information is used to identify the type of application included in a device connected to a communication apparatus and the types of protocol, interface, and the like.

The application attribute information shown in FIG. 8 is structured of an application identifier which indicates the type of main application of a connected device, a connection protocol identifier which indicates the type of connected communication protocol, an interface identifier which indicates the type of connected interface, a manufacturer identifier which indicates the manufacturer name of an application device, a vendor identifier which indicates the vendor name of an application device, a product name identifier which indicates a connected product name, and a serial number identifier which indicates the individual serial number of the product.

Figure 9:
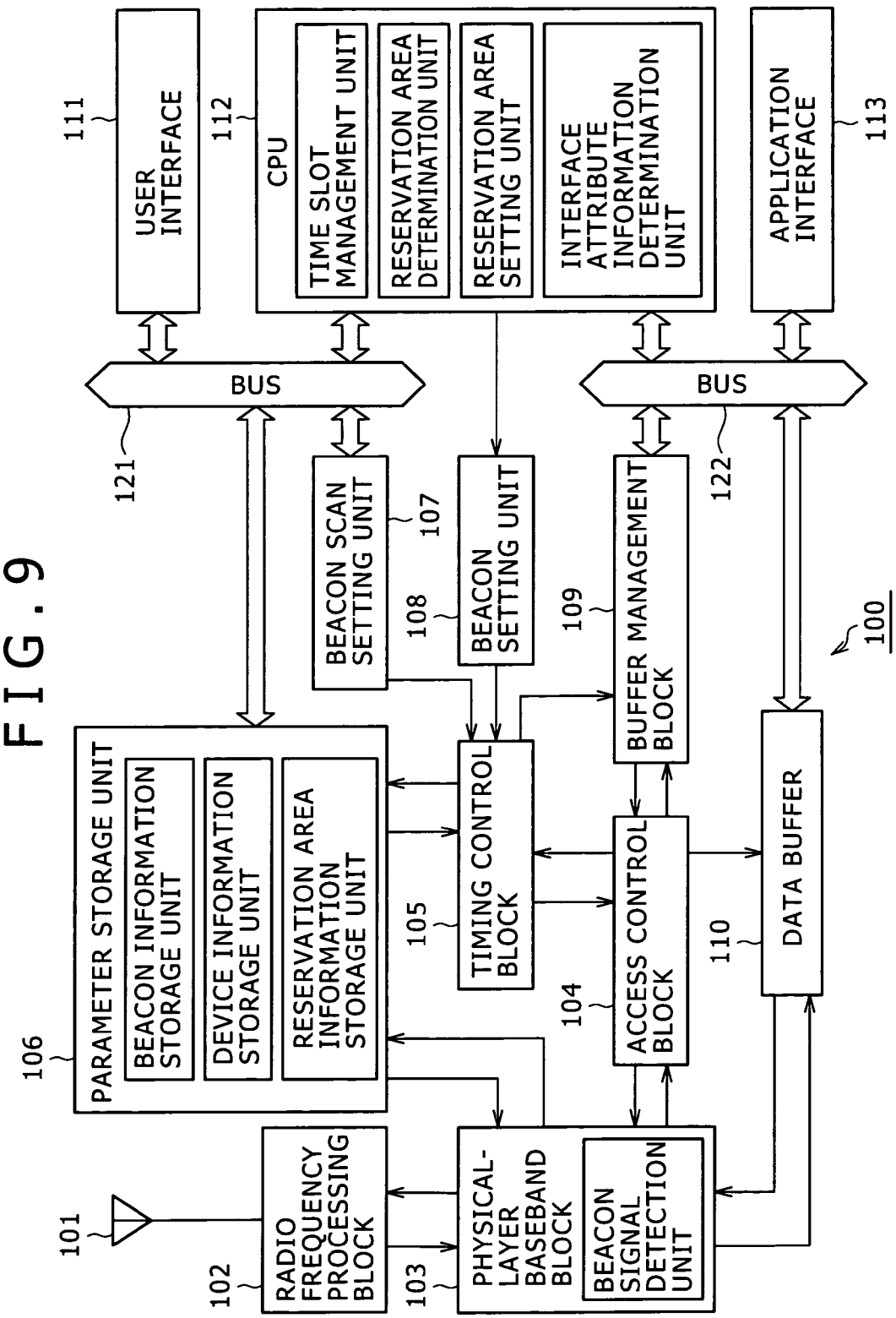
FIG. 9 is a block diagram of a wireless communication apparatus that can operate as a communication apparatus in an autonomous distributed network according to an embodiment of the invention.

FIG. 9 exemplifies the block diagram of a wireless communication apparatus that can operate as a communication apparatus in an autonomous distributed network according to this embodiment. The wireless communication apparatus 100 sets one beacon period in a superframe period among other communication apparatuses in the same network group, thereby forming one network group. Further, a network group is formed only by communication apparatuses that have gone through authentication processes specified by users. Therefore, even if network groups having different beacon periods spatially overlap each other in wireless coverage, the combination of network groups (i.e., the merger of beacon periods) is not performed with an unauthenticated communication apparatus. While allowing another communication apparatus to set a different beacon period, a communication apparatus enters a plurality of beacon periods to exchange data with a communication apparatus in another network group as necessary.

As shown in FIG. 9, the wireless communication apparatus 100 includes an antenna 101 for transmitting and receiving a predetermined radio frequency signal on a wireless medium, a radio frequency processing block 102 which amplifies the received radio frequency signal into a reception signal and amplifies a transmission signal into a radio frequency signal, and a physical-layer baseband block 103 which constructs information bits by performing predetermined demodulation on a desired reception signal and generates a transmission signal by modulating information bits to be transmitted.

Further, the wireless communication apparatus 100 includes an access control block 104 which performs predetermined access control among adjacent communication apparatuses in order to perform wireless communication and a timing control block 105 which controls timing for performing media access operation in units of predetermined time slots (MAS) in a superframe period.

Further, the wireless communication apparatus 100 includes a parameter storage unit 106 which stores various kinds of parameters necessary for timing control etc. of operation stipulated by a physical-layer protocol and media access operation. The parameter storage unit 106 includes memory areas such as a beacon information storage unit which stores beacon parameters transmitted from adjacent communication apparatuses in a beacon period of the network group of the communication apparatus 100, a device information storage unit which stores adjacent-device-specific information, and a reservation period information storage unit which stores reservation period information.

Further, the wireless communication apparatus 100 includes a beacon scan setting unit 107 which sets a scan operation with arbitrary timing at the time of grasping the existence of a different beacon group in order to control a beacon transmission/reception operation essential to the operation of a network and a beacon setting unit 108 which sets the timing of transmission beacon of the communication apparatus and parameters in a transmission beacon.

Further, the wireless communication apparatus 100 includes a data buffer 110 which is a memory configuration for storing reception data and transmission data in order to handle transmission/reception data and a buffer management block 109 which manages access to the data buffer 110 and a memory area.

Furthermore, a user interface 111 for predetermined input and output and a CPU (Central Processing Unit) 112 which performs centralized control of the whole operation of the apparatus 100 are connected via a bus 121 to the wireless communication apparatus 100.

A variety of programs for controlling the wireless communication apparatus 100 are preloaded on the CPU 112, thereby configuring a time slot management unit which manages time slots that the communication apparatus 100 uses, a reservation period determination unit which determines reservation periods of adjacent communication apparatuses, a reservation period setting unit which sets a reservation period of the communication apparatus 100 as necessary, and an interface attribute information determination unit. Executing these programs enables an operation for setting a beacon period among communication apparatuses that have gone through authentication processes and forming a network group, an operation for entering a plurality of beacon periods and exchanging data with communication apparatuses in other network groups, and processing for determining whether or not to accept a connection request from another network group.

Further, an application interface 113 is connected via a bus 122 to the buffer management block 109 and the data buffer 110. The application interface 113 is in conformity with a high-speed serial bus standard such as USB (Universal Serial Bus) and IEEE1394 or a general-purpose interface such as a CardBus interface. The application interface 113 is used in order to transfer data at high speed to/from an application device (not shown) connected to the wireless communication apparatus 100. Further, the bus 122 is also connected to the CPU 112 and operates a series of operations under the control of CPU 112.

Figure 10:
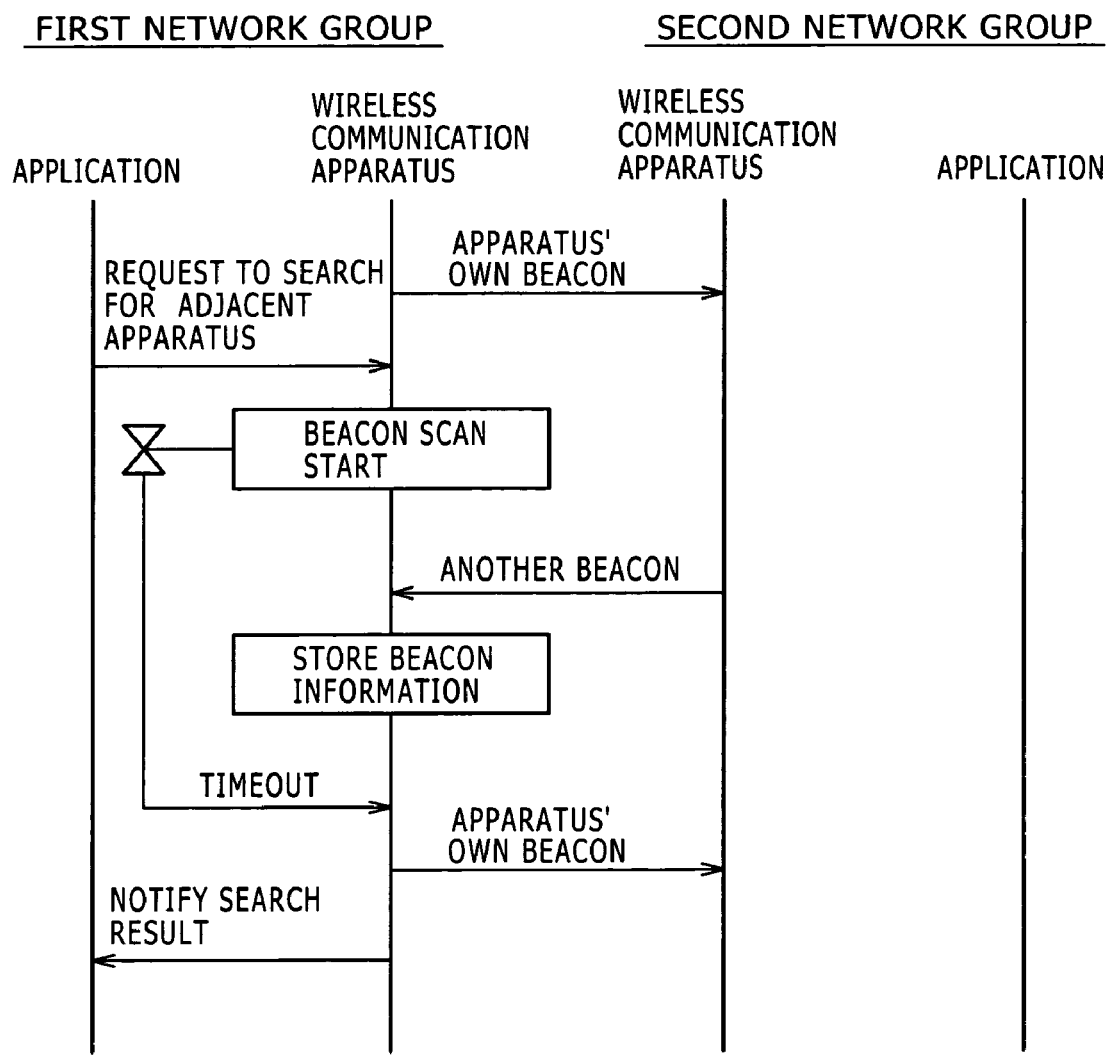
FIG. 10 is a diagram showing an operation sequence by which a communication apparatus performs a network search in an autonomous distributed network according to an embodiment of the invention.

FIG. 10 shows an operation sequence by which a communication apparatus performs a network search in an autonomous distributed network according to this embodiment. The sequence is used in the case where the communication apparatus performs a beacon scan operation at initial settings after power-on or reset or in the case where the communication apparatus searches for an adjacent device that operates with a different network period according to an instruction from an upper layer of a connected device with arbitrary timing. In the operation example of FIG. 10, the communication apparatus performs a beacon scan over a predetermined superframe period while transmitting its own beacon.

First, upon receipt of a request from an application side to search for an adjacent communication apparatus, the communication apparatus sets a timer of beacon scan time and performs beacon reception processing.

Further, the communication apparatus in the first network group transmits its own beacon also in a beacon period set in the first network group.

If the communication apparatus receives a beacon from another communication apparatus within a timeout period of the timer, the communication apparatus stores the beacon information in the parameter storage unit 106. After the timeout, the communication apparatus notifies the received beacon as a search result to the application which is an upper layer.

Figure 11:
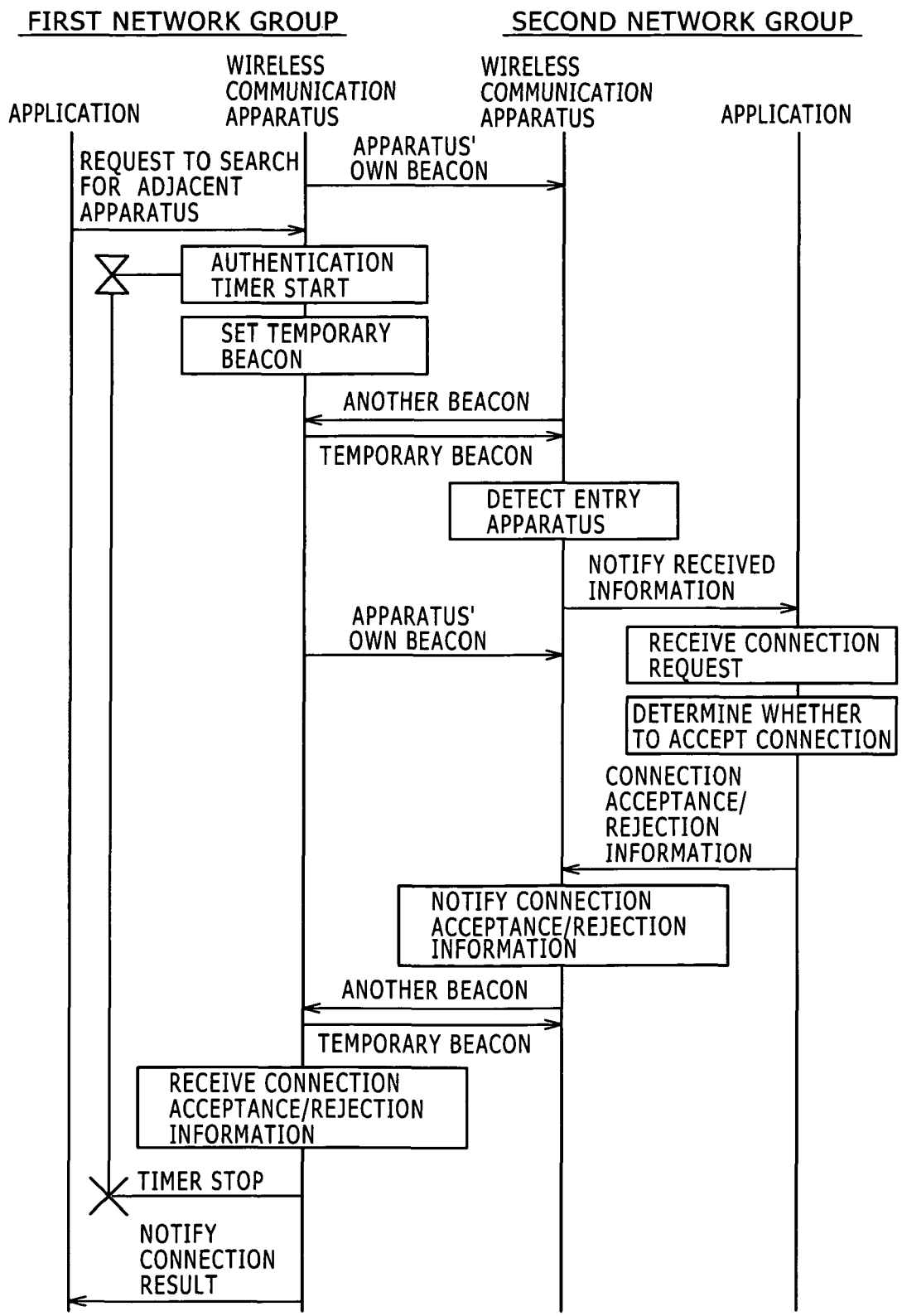
FIG. 11 is a diagram showing an operation sequence by which a communication apparatus performs a network connection in an autonomous distributed network according to an embodiment of the invention.

FIG. 11 shows an operation sequence by which the communication apparatus performs a network connection in the autonomous distributed network according to this embodiment. The sequence is used in the case where the communication apparatus of the first network group temporarily transmits a beacon signal to the second network group having a different beacon period from that of the first network group and it is determined whether or not to accept a network connection across the network groups.

The communication apparatus in the first network group transmits its own beacon also in a beacon period set in the first network group.

Upon receipt of a request from the application side to connect to an adjacent communication apparatus, the communication apparatus sets a timer of confirmation time of an authentication sequence and sets a temporary beacon to be transmitted.

The communication apparatus in the first network group transmits a temporary beacon at the arrival of a desired timing. At this time, the communication apparatus sets a beacon slot position for a new entry in a beacon period set in the second network group to which the communication apparatus attempts a network connection. More specifically, the communication apparatus recognizes a beacon period and a vacant beacon slot position in the period by receiving a beacon from a communication apparatus of the second network group, and transmits a temporary beacon in order to enter the second network group.

Further, the communication apparatus in the first network group transmits its own beacon also in a beacon period set in the first network group.

At the other end, the communication apparatus in the second network group receives the temporary beacon and thereby detects a newly entering communication apparatus.

Further, the communication apparatus in the second network group notifies information obtained from the received beacon to an application side.

The application side determines that the beacon information is a connection request, further determines whether or not to accept the connection, and notifies connection acceptance/rejection information to the communication apparatus. Further, the communication apparatus in the second network group transmits the connection acceptance/rejection information with a beacon signal in a beacon period to the connection requesting apparatus, that is, the communication apparatus in the first network group. Further, the communication apparatus in the first network group transmits a temporary beacon in this beacon period.

The communication apparatus in the second network group can effectively grasp a beacon period of the different network group and a setting state of a reservation period by receiving the temporary beacon from the communication apparatus in the first network group.

Upon receipt of connection acceptance/rejection information from the application, the communication apparatus in the second network group describes the connection acceptance/rejection information in the next beacon for example and transmits it. Upon receipt of the connection acceptance/rejection information in the beacon signal, the communication apparatus in the first network group stops the authentication timer, and notifies the connection acceptance/rejection result to the application side, in accordance with the reception state.

Figure 12:
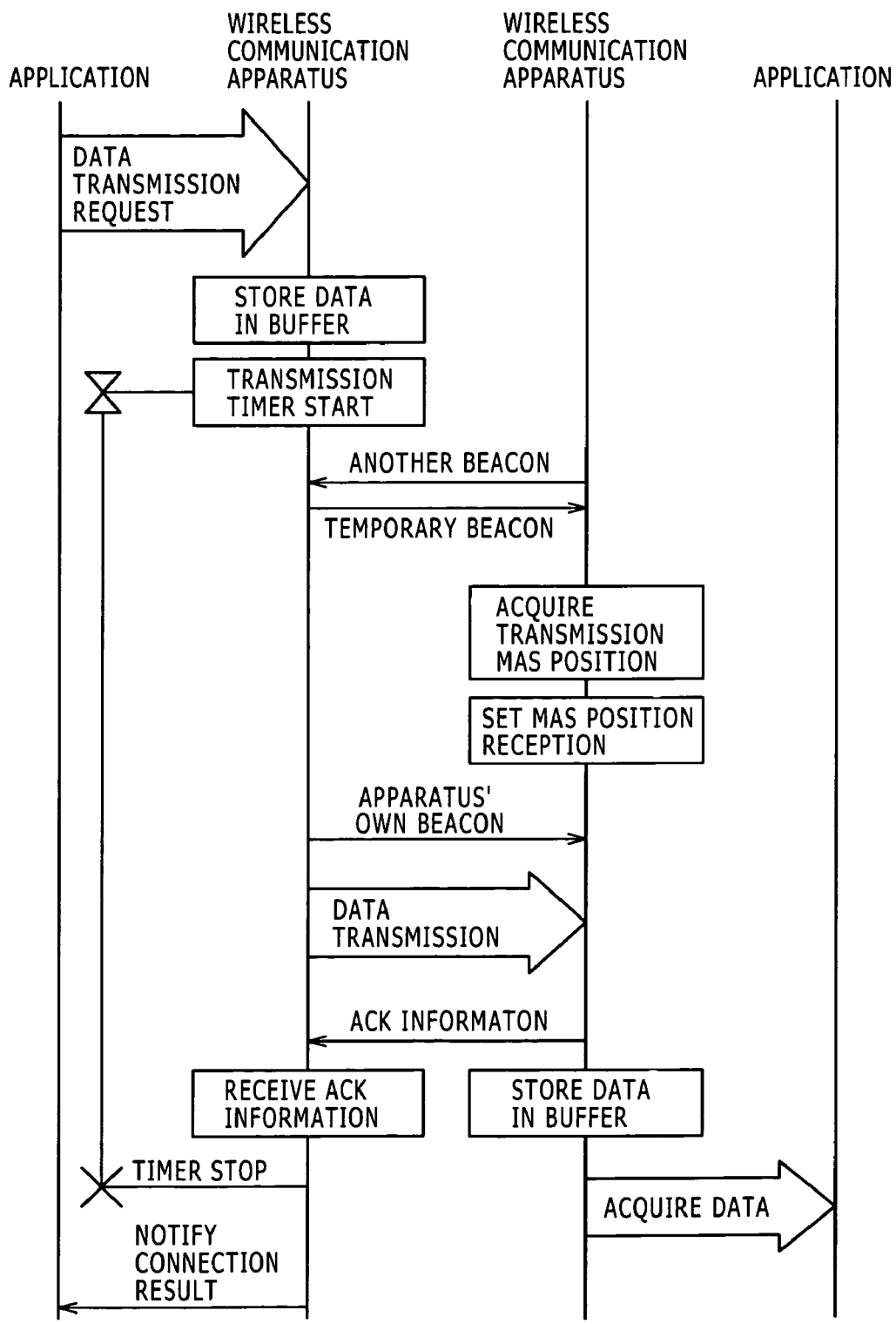
FIG. 12 is a diagram showing an operation sequence by which a communication apparatus transmits application data in an autonomous distributed network according to an embodiment of the invention.

FIG. 12 shows an operation sequence by which the communication apparatus transmits application data in the autonomous distributed network according to this embodiment. In the sequence of FIG. 12, the communication apparatus in the first network group transmits application data to the communication apparatus in the second network group having a different beacon period from that of the first network group.

Upon receipt of an application data transmission request from the application side, the wireless communication apparatus in the first network group temporarily stores transmission data in the data buffer 110. Further, the communication apparatus in the first network group sets a transmission timer of transmission limit time and sets a data transmission timing, i.e., a transmission MAS position for the destination communication apparatus in the second network group. Furthermore, the communication apparatus in the first network group describes a parameter concerning the transmission MAS position in a temporary beacon (described above).

Further, upon arrival of the transmission timing of the temporary beacon (assume that the connection is established by the above-described network connection), the wireless communication apparatus in the first network group transmits the temporary beacon.

At the other end, the wireless communication apparatus in the second network group analyzes the received temporary beacon so as to acquire the transmission MAS position information by which the communication apparatus in the first network group transmits data to the communication apparatus in the second network group. The timing control block 105 sets a reception timing at the MAS position.

The wireless communication apparatus in the second network group can effectively grasp a beacon period of the different network group and a setting state of a reservation period by receiving a beacon from the communication apparatus in the first network group.

The wireless communication apparatus in the first network group transmits its own beacon also in a beacon period set in the first network group.

Upon arrival of the set transmission MAS position, the wireless communication apparatus in the first network group transmits the application data stored in the data buffer 110.

The wireless communication apparatus in the second network group performs a reception operation at the transmission MAS position addressed thereto. Upon receipt of the application data from the wireless communication apparatus in the first network group, the wireless communication apparatus in the second network group temporarily stores the application data in the data buffer 110 and makes a notification to the application side. The application receives the data as necessary.

In the case where the wireless communication apparatus in the second network group has received the application data correctly, the wireless communication apparatus in the second network group transmits acknowledgement (ACK) information to the wireless communication apparatus in the first network group. With the receipt of the ACK information, the sender wireless communication apparatus in the first network group stops the transmission timer and notifies the transmission result to the requesting application side.

Figure 13:
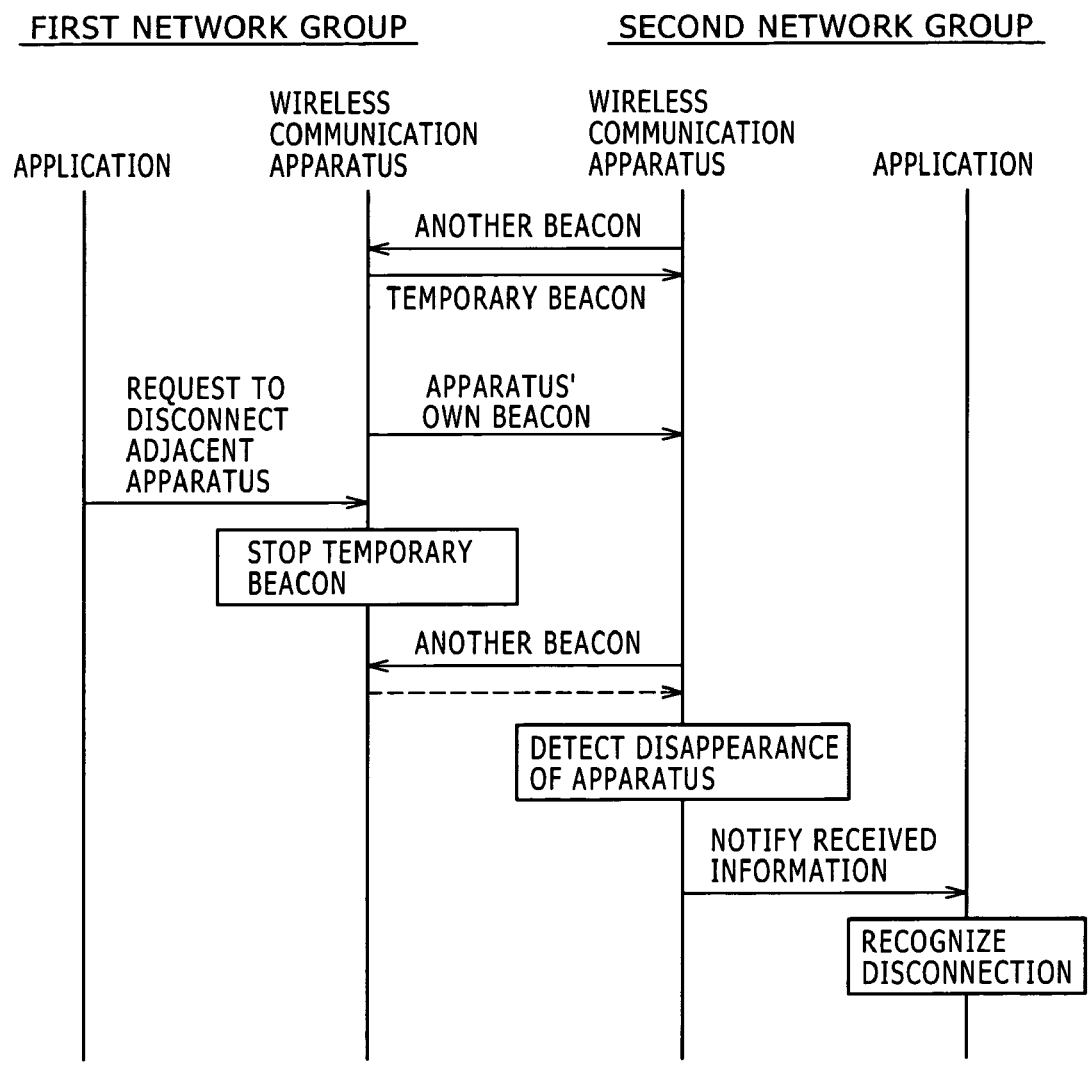
FIG. 13 is a diagram showing an operation sequence by which a communication apparatus performs a disconnection setting in an autonomous distributed network according to an embodiment of the invention.

FIG. 13 shows an operation sequence by which the communication apparatus performs a disconnection setting in the autonomous distributed network according to this embodiment. In the operation example of FIG. 13, after the wireless communication apparatus in the first network group transmits a temporary beacon to the second network group having a different beacon period from that of the first network group to maintain the connection for data communication (e.g., see FIG. 11), the network groups are disconnected.

The wireless communication apparatus in the first network group receives a beacon and also transmits a temporary beacon in a beacon period set in the second network group which is network-connected to the first network group. Further, the wireless communication apparatus in the first network group transmits its own beacon in a beacon period set in the first network group.

Upon receipt of a request from the application side to disconnect an adjacent communication apparatus, the wireless communication apparatus in the first network group stops the transmission of a temporary beacon.

At the other end, in the case where there is no temporary beacon received from the wireless communication apparatus in the first network group over a predetermined time period, the wireless communication apparatus in the second network group detects that the communication apparatus disappears from the network group. Further, the wireless communication apparatus in the second network group notifies the disappearance to the application, and also the application detects the occurrence of a disconnection. As a matter of course, it may be configured to perform disconnection processing by an explicit disconnection request instead of stopping the transmission of a temporary beacon.

Further, after the disconnection, the wireless communication apparatus in the second network group can effectively grasp a beacon period of the different network group and a setting state of a reservation period by receiving a (temporary) beacon from the wireless communication apparatus in the first network group.

Figure 14:
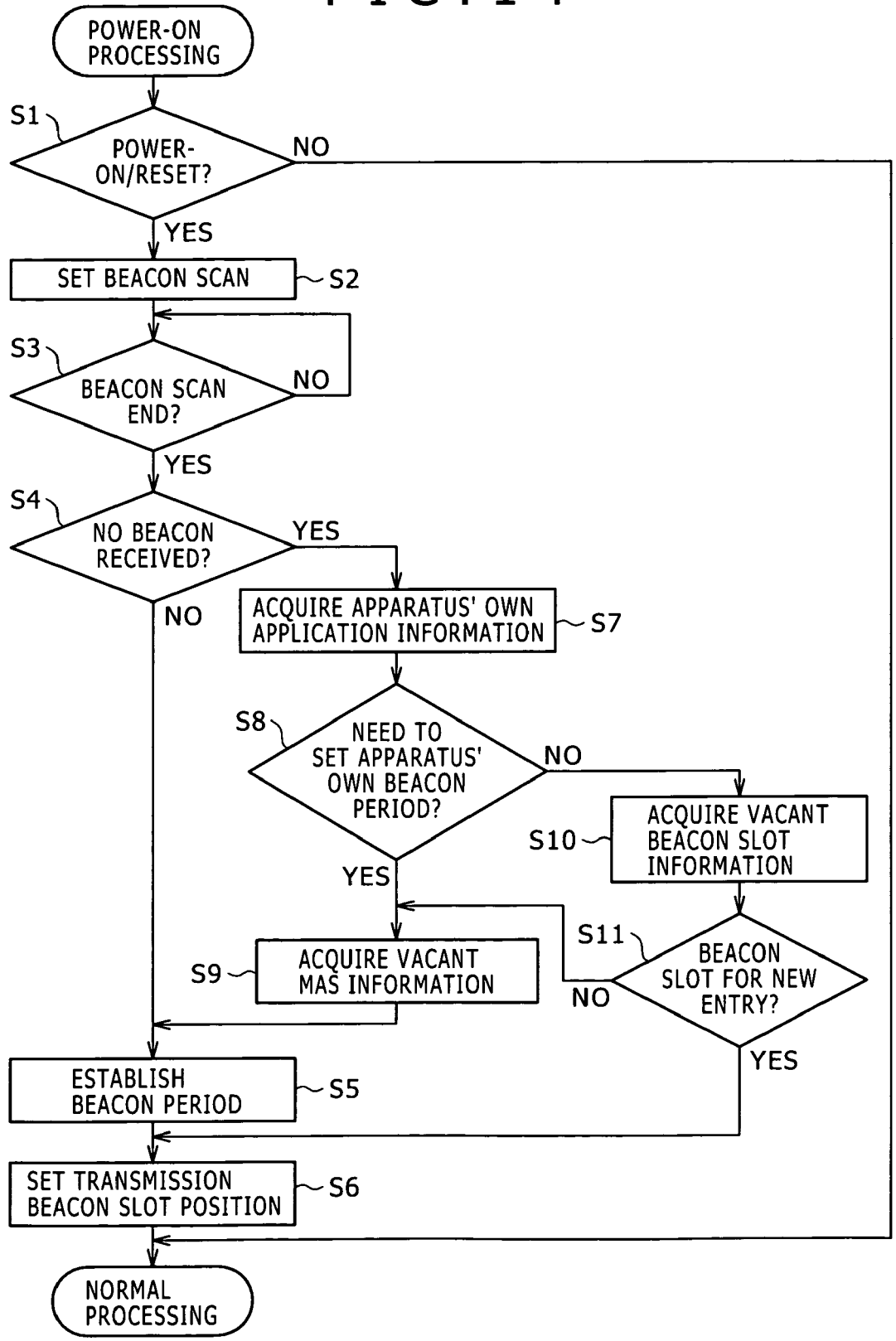
FIG. 14 is a flowchart showing the operation procedure executed after power-on by a wireless communication apparatus operating in an autonomous distributed network according to an embodiment of the invention.

FIG. 14 is a flowchart showing the operation procedure executed after power-on by the wireless communication apparatus 100 operating in the autonomous distributed network according to this embodiment. In FIG. 14, consideration will be given to a state of resetting a series of operations of the wireless communication apparatus after power-on or reset setting.

First, if power is turned on or resetting is performed in the wireless communication apparatus 100 (step S1), the wireless communication apparatus sets a beacon scan (step S2). Further, the wireless communication apparatus operates a receiver to collect beacons notified from adjacent communication stations until the completion of the beacon scan over a predetermined time period (step S3).

If the wireless communication apparatus has not received any beacon (step S4), the wireless communication apparatus makes itself the first communication apparatus that constructs a network group, and establishes a beacon period in a superframe period (see FIG. 2) (step S5). Further, the wireless communication apparatus sets its own transmission beacon slot position in this beacon period (step S6).

If the wireless communication apparatus has received a beacon signal from an adjacent communication apparatus by the beacon scan operation (step S4), the wireless communication apparatus acquires its own application information, i.e., application attribute information concerning an application device connected via the application interface 113 (see FIG. 7) (step S7). Further, the wireless communication apparatus determines whether to enter the network group of the sender communication apparatus of the received beacon to acquire its own transmission beacon slot position in a beacon period at the other end or need to set its own beacon period (step S8).

In such a case where an application device connected to the wireless communication apparatus 100 is a device shared by a plurality of users such as a printer and it should not belong to any network group so that communication apparatuses in network groups can exchange data as necessary, the wireless communication apparatus 100 determines that it is necessary to set its own beacon period. Alternatively, in the case where as a result of analyzing the received beacon signal, the communication apparatus at the other end is not one that has gone through an authentication process specified by a user and therefore should not or need not enter the same network group, the wireless communication apparatus 100 determines that it is necessary to set its own beacon period different from that of the received beacon.

Thus, if the wireless communication apparatus determines at step S8 that it is necessary to set its own beacon period, the wireless communication apparatus acquires vacant MAS information in a superframe by analyzing the received beacon (step S9). Further, the wireless communication apparatus establishes a new beacon period in a part of the vacant MAS (step S5), and sets the first transmission beacon slot position for its own use in the beacon period (step S6). By thus setting a beacon period different from the existing beacon period, the wireless communication apparatus has formed a new network group instead of entering the existing network group.

If the wireless communication apparatus determines at step S8 that it is not necessary to set its own beacon period, that is, if the wireless communication apparatus determines that it may or should enter an existing network group, the wireless communication apparatus acquires vacant beacon slot information in a beacon period set in the existing network group from the received beacon information (step S10). If there is provided a beacon slot for a new entry (step S11), the wireless communication apparatus sets the beacon slot to its own transmission beacon slot position (step S6).

If there is not provided a beacon slot for a new entry (step S11), it is impossible to enter the existing network group. In this case as well, the wireless communication apparatus acquires vacant MAS information in a superframe by analyzing the received beacon (step S9). Further, the wireless communication apparatus establishes a new beacon period in a part of the vacant MAS (step S5), and sets the first transmission beacon slot position for its own use in the beacon period (step S6).

Figure 15:
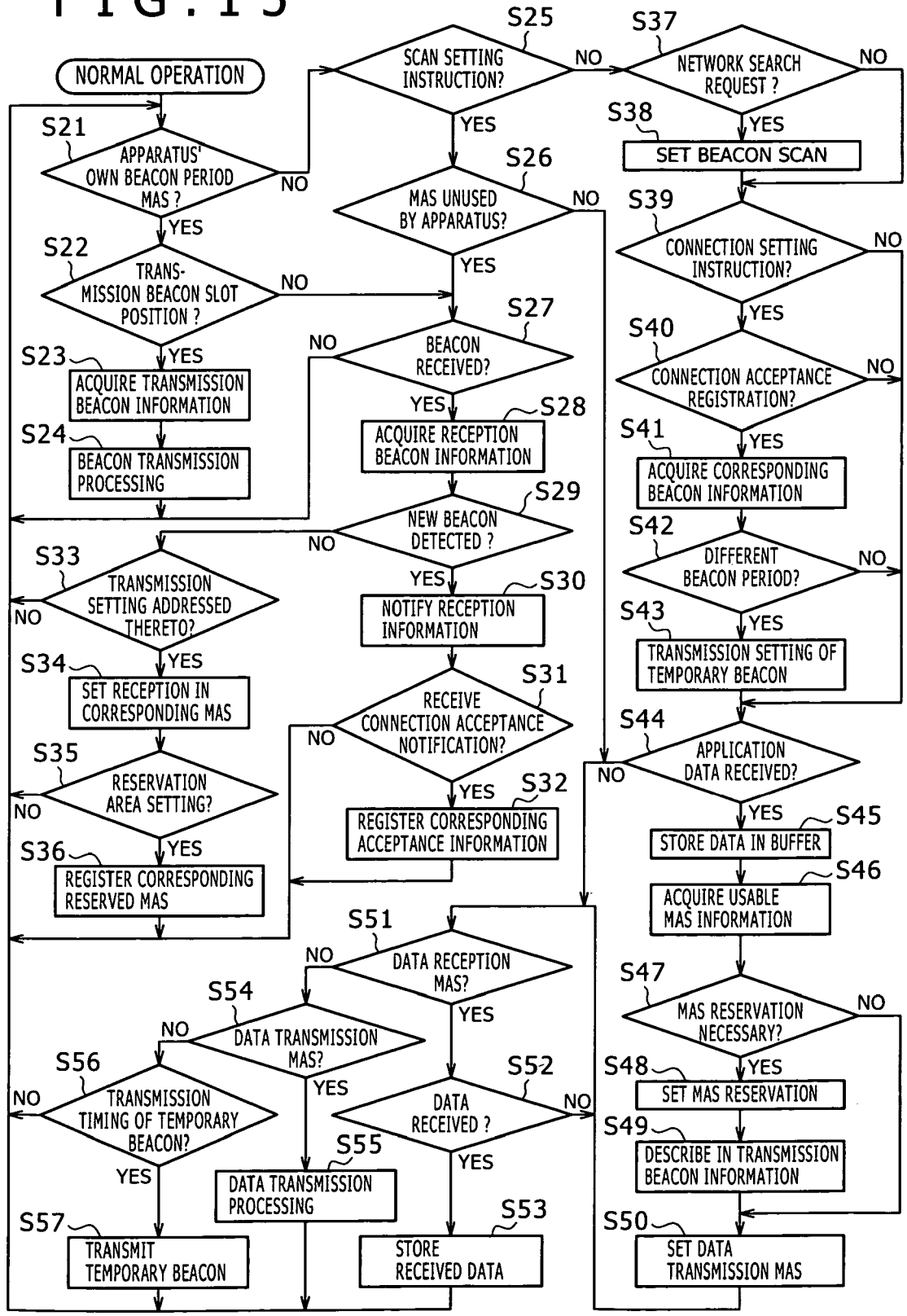
FIG. 15 is a flowchart showing the procedure of the normal operation executed by a wireless communication apparatus operating in an autonomous distributed network according to an embodiment of the invention.

FIG. 15 is a flowchart showing the procedure of the normal operation executed by the wireless communication apparatus in the autonomous distributed network according to this embodiment. In FIG. 15, there are defined repeated operations in which the wireless communication apparatus 100 establishes its own transmission beacon slot in a superframe period and then periodically transmits and receives beacons to form a network.

In the wireless communication apparatus 100, the timing control block 105 controls timing for performing media access operation in units of predetermined time slots (MAS) in a superframe period. If a MAS for the apparatus' own beacon period arrives (step S21) and if the apparatus' own transmission beacon slot position arrives (step S22), the wireless communication apparatus acquires transmission beacon information to establish a beacon frame (step S23), and performs beacon transmission processing (step S24).

Further, if there is a scan setting instruction in a period other than the beacon period in a superframe period (step S25), the wireless communication apparatus performs a scan operation, i.e., a beacon reception operation in a MAS unused by the apparatus (step S26).

Further, if a MAS for the apparatus' own beacon period in a superframe period arrives (step S21) and if a period other than the apparatus' own transmission beacon slot position arrives (step S22), the wireless communication apparatus also performs a beacon reception operation.

If the wireless communication apparatus receives a beacon signal (step S27) as a result of the scan operation, the wireless communication apparatus acquires the reception beacon information (step S28). Further, if the wireless communication apparatus detects a new beacon (step S29), the wireless communication apparatus notifies the reception information to an application (step S30).

In this context, a new beacon signifies a beacon that a communication apparatus that has not belonged to the same network group transmits using the beacon period of the group in order to enter the group. The autonomous distributed network according to this embodiment allows a communication apparatus to enter a plurality of beacon periods, thus permitting the presence of different beacon periods. The application side determines whether or not to accept a connection with a communication apparatus that attempts an entry from another network group. The application which is, for example, shared by a plurality of users such as a printer determines whether to exchange data with a communication apparatus transmitting a new beacon.

If the wireless communication apparatus receives a connection acceptance notification from the application side within a fixed time period (step S31), the wireless communication apparatus registers the connection acceptance information concerning the corresponding communication apparatus (step S32). If the wireless communication apparatus has not received a connection acceptance notification, the wireless communication apparatus does not register connection acceptance information.

If the wireless communication apparatus detects an existing beacon in place of a new beacon (step S29), the wireless communication apparatus checks whether there is a transmission setting addressed thereto described in the beacon (step S33). If there is a transmission setting addressed thereto, the wireless communication apparatus sets its own reception operation in the corresponding MAS (step S34). Further, if there is a reservation period setting in the existing beacon (step S35), the wireless communication apparatus registers the corresponding MAS reserved (step S36).

If it is not a MAS unused by the apparatus at the time of a scan setting instruction (step S26), the process moves to respective operations in data transmission MAS and data reception MAS (described later).

If there is not a scan setting instruction and if there is a network search request from the application side (step S37), the wireless communication apparatus sets a beacon scan (step S38).

Further, if there is a connection setting instruction (step S39) and if there is a registration of connection acceptance (step S40), the wireless communication apparatus acquires the corresponding beacon information (step S41) and establishes a connection.

Further, if the corresponding communication apparatus has a different beacon period (step S42), the wireless communication apparatus performs a transmission setting of a temporary beacon toward the beacon period (step S43).

If the wireless communication apparatus receives transmission data from the application (step S44), the wireless communication apparatus temporarily stores the data in the data buffer 110 (step S45). Further, the wireless communication apparatus acquires its own usable MAS information (step S46). If it is necessary to make a MAS reservation (step S47), the wireless communication apparatus performs a reservation setting of a usable MAS (step S48), describes the reservation setting in transmission beacon information (step S49), and sets a data transmission MAS (step S50).

Further, if it is not necessary make a reservation for transmission of the data from the application (step S47), the wireless communication apparatus sets an arbitrary MAS to a data transmission MAS (step S50).

If a data reception MAS arrives (step S51), the wireless communication apparatus performs data reception processing. At this time, if the wireless communication apparatus has received data (step S52), the wireless communication apparatus stores the received data in the data buffer 110 (step S53) and notifies the receipt to the application. Further even if the wireless communication apparatus has not received data, the wireless communication apparatus continues performing reception operation as long as data reception MAS continues.

Further, if a data transmission MAS arrives (step S54), the wireless communication apparatus performs data transmission processing based on a predetermined access control procedure (step S55).

Further, if a transmission timing of a temporary beacon set in a beacon period of the other network group arrives (step S56), the wireless communication apparatus transmits the temporary beacon (step S57).

The wireless communication apparatus 100 may go into sleep mode in the other unused MAS. Alternatively, it is possible to enable only the section for processing a request from the application.

After a series of operations ends, the process returns to step S21 to repeat a series of steps.

Figure 16:
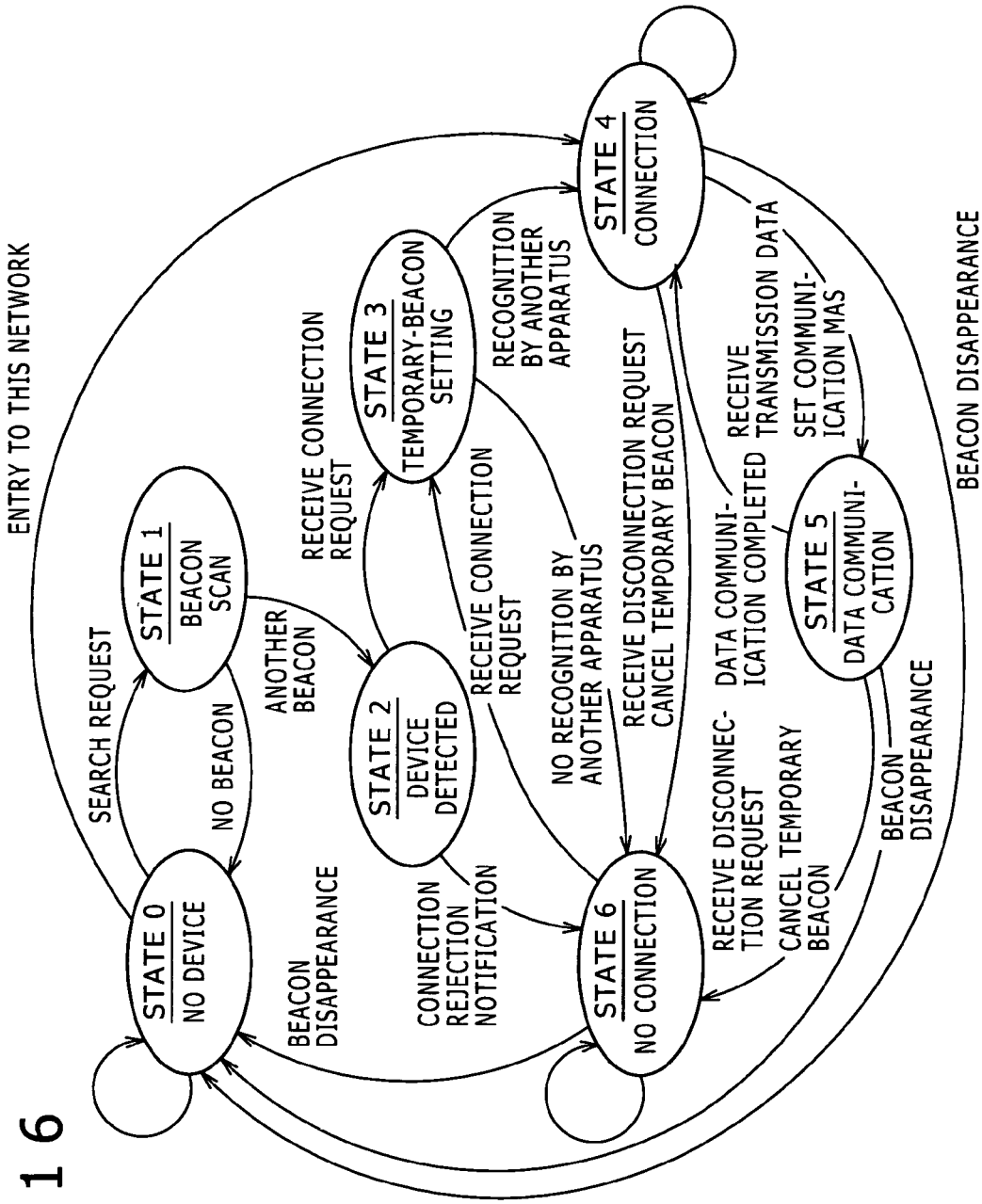
FIG. 16 is a flowchart exemplifying the structure of state transitions of a wireless communication apparatus operating in an autonomous distributed network according to an embodiment of the invention.

FIG. 16 is a flowchart exemplifying the structure of state transitions of the wireless communication apparatus 100 operating in the autonomous distributed network according to this embodiment.

If there is no communication apparatus that constitutes an ad-hoc network, the wireless communication apparatus 100 is in the state of "no device" (state 0). If at state 0 the wireless communication apparatus 100 receives a network search request from the application, the wireless communication apparatus 100 transitions to the state of "beacon scan" (state 1).

If there is a communication apparatus that has entered the beacon group of the wireless communication apparatus 100, the wireless communication apparatus 100 transitions to the state of "connection" (state 4). For example, if the detected device is a device-authenticated communication apparatus that a user intends, the authenticated communication apparatus enters the network group of the wireless communication apparatus 100.

If the wireless communication apparatus 100 receives a beacon of another network during the beacon scan at state 1, the wireless communication apparatus 100 transitions to the state of "device detected" (state 2) and makes a notification to the application. If the wireless communication apparatus 100 receives no beacon during the beacon scan operation, the wireless communication apparatus 100 returns to the state of "no device" (state 0).

If the wireless communication apparatus 100 receives a connection request from the application in the state of "device detected" (state 2), the wireless communication apparatus 100 transitions to the state of "temporary-beacon setting" (state 3) and performs a transmission setting of a temporary beacon using a beacon period in the network group at the other end. If the communication apparatus at the other end recognizes the existence of the wireless communication apparatus 100 when the wireless communication apparatus 100 transmits the temporary beacon, the wireless communication apparatus 100 transitions to the state of "connection" (state 4) and manages the device.

Thus, a communication apparatus transmits temporary beacons in the different beacon periods of two or more network groups, thereby permitting the communication apparatus to enter the respective network groups. In other words, this corresponds to permitting the presence of different beacon periods, and it is possible to stabilize network operation without combining and separating networks frequently. For example, a communication apparatus connected with a device shared by a plurality of users such as a printer does not belong to any network group, and communication apparatuses in network groups can exchange data as necessary.

On the other hand, if the communication apparatus at the other end does not recognize the existence or if the wireless communication apparatus 100 receives a connection rejection notification from the application in the state of "device detected" (state 2), the wireless communication apparatus 100 transitions to the state of "no connection" (state 6) and manages the network.

If the wireless communication apparatus 100 receives transmission data in the state of "connection" (state 4), the wireless communication apparatus 100 transitions to the state of "data communication" (state 5) and sets a MAS for communication to perform predetermined data communication. After the completion of the data communication, the wireless communication apparatus 100 temporarily returns to the state of "connection" (state 4).

Further, if the wireless communication apparatus 100 receives a disconnection request from the application, the wireless communication apparatus 100 cancels the temporary-beacon setting and transitions to the state of "no connection" (state 6). If the wireless communication apparatus 100 receives a same disconnection request even in the state of "data communication", the wireless communication apparatus 100 cancels the temporary-beacon setting and transitions to the state of "no connection" (state 6).

If the wireless communication apparatus 100 receives a connection request from the application in the state of "no connection" (state 6), the wireless communication apparatus

100 transitions to the state of "temporary-beacon setting" (state 3) and starts to transmit a predetermined temporary beacon.

Further, if the wireless communication apparatus 100 cannot receive a beacon of the corresponding communication apparatus at the other end continuously over a predetermined time period in the state of "connection" (state 4), the state of "no connection" (state 6), and the state of "data communication" (state 5), the wireless communication apparatus 100 recognizes beacon disappearance and returns to the state of "no device" (state 0).

According to the communication operations based on the state transitions described above, a communication apparatus in a network system makes a close connection to an authenticated communication apparatus in the same group and makes a loose connection to a communication apparatus in the other groups. Therefore, the adoption of a network connection method of a shared device such as a printer does not cause security threat to a network group.

In the example shown in FIG. 16, if the wireless communication apparatus 100 detects the existence of a device (state 2) by a beacon scan operation (state 1), the wireless communication apparatus 100 sets a temporary beacon, that is, enters another network group according to a connection request from the application. However, if the detected device is a device-authenticated communication apparatus that a user intends, the network groups may be combined by merging mutual beacon periods in place of a temporary entry to the network.

The invention has been described in detail with reference to the specific embodiment. However, it is obvious that those skilled in the art can make modifications and/or substitutions of the embodiment without departing from the scope and sprit of the invention.

In this specification, the description has been made on the embodiment applied to an autonomous distributed network formed by communication apparatuses transmitting beacon signals without a particular control station. However, the scope and sprit of the invention is not limited to the embodiment. The invention can also be applied to a system in which a network is operated by setting a beacon period for each network group even in the case where a control station is disposed or only apart of the communication apparatuses transmit beacon signals.

That is, the embodiment has been described for illustrative purpose only, and the contents of the specification should not be interpreted restrictively. To understand the scope and sprit of the invention, the appended claims should be taken into consideration.

What is claimed is:

1. A wireless communication system in which a first beacon period is set at every predetermined period in a first network group and communication apparatuses in the first network group exchange beacon containing information concerning a network so as to form the first network group, the wireless communication system comprising:

a communication apparatus in the first network group;

a beacon generator generating a temporary beacon and a first beacon signal corresponding to a first beacon of the communication apparatus, the temporary beacon being separate from the first beacon;

a beacon scan setting unit searching for an adjacent second network group having a second beacon period different from the first beacon period by transmitting the first beacon in a beacon scan;

an authentication unit for authenticating the second network group to determine a type of connection to be formed between the communication apparatus and the second network group; and an application interface for using the first beacon and the temporary bacon to exchange data between the communication apparatus having the first beacon period and the second network group having the second beacon period without merging the first beacon period and the second beacon period into a single beacon period when the type of connection is determined to be an unsecure connection, wherein the application interface exchanges data between the communication apparatus and the second network group by merging the first beacon period and the second beacon period when the type of connection is determined to be a secure connection.

2. The wireless communication system according to claim 1, wherein the communication apparatus detects the second network group by receiving a second beacon signal corresponding to a beacon in the second beacon period.

3. The wireless communication system according to claim 1, wherein the communication apparatuses in the first network group spatially overlap each other in wireless coverage, and are included in the first network group after being authenticated based on user specified criteria.

4. The wireless communication system according to claim 1, wherein the communication apparatus acquires a reservation period in the second network group by analyzing a second beacon signal received from the second network group, and sets a reservation period in the first network group and the second network group by using the temporary beacon and by avoiding the reservation period.

5. The wireless communication system according to claim 1, wherein if the communication apparatus needs to communicate with the second network group, the communication apparatus enters the network group by transmitting the first beacon during the first beacon period, and the communication apparatus exchanges data with a second communication apparatus in the second network group.

6. The wireless communication system according to claim 1, wherein a shared communication apparatus connected with a device shared by a plurality of users sets its own beacon period independently of any network group, and if the communication apparatus communicates with the shared communication apparatus, the communication apparatus enters a network group of the shared communication apparatus by transmitting the first beacon during the first beacon period to exchange data.

7. A wireless communication apparatus which operates in a wireless communication environment where a first beacon period is set at every predetermined period in a first network group and communication apparatuses in the first network group exchange beacon containing information concerning a network so as to form the first network group, the wireless communication apparatus comprising:

a communication unit transmitting and receiving wireless data over a transmission path;

a beacon generator generating a temporary beacon and a first beacon signal corresponding to a first beacon of the wireless communication apparatus, the temporary beacon being separate from the first beacon;

a beacon analyzer analyzing a second beacon signal received, in response to transmission of the first beacon in a beacon scan, from an adjacent communication apparatus in a second network group and having a second beacon period different form the first beacon period;

an authentication unit for authenticating the adjacent communication apparatus to determine a type of connection to be formed between the wireless communication apparatus and the adjacent communication apparatus; and a communication controller controlling a data transmission/reception operation in the communication unit, the communication controller controlling a communication operation for the first network group based on a result of the analysis of the second beacon signal, the first beacon, and the temporary beacon, wherein the communication unit is configured to facilitate exchange of data between the wireless communication apparatus having the first beacon period and the adjacent apparatus having the second beacon period without merging the first beacon period and the second beacon period into a single beacon period when the type of connection is determined to be an unsecure connection, and wherein the communication unit is further configured to facilitate exchange of data between the wireless communication apparatus and the adjacent apparatus by merging the first beacon period and the second beacon period when the type of connection is determined to be a secure connection.

8. The wireless communication apparatus according to claim 7, wherein the communication controller searches the second network group by performing the beacon scan and enters the second network group by transmitting the first beacon and the temporary beacon.

9. The wireless communication apparatus according to claim 7, wherein the adjacent communication apparatus is included in the first network group after being authenticated based on user specified criteria.

10. The wireless communication apparatus according to claim 7, wherein the communication controller acquires a reservation period in the second network group based on the result, and sets a reservation period in the first network group and the second network group by using the temporary beacon and by avoiding the acquired reservation period.

11. The wireless communication apparatus according to claim 7, wherein if the communication controller needs to communicate with the second network group, the communication controller enters the network group by transmitting the first beacon and the temporary beacon during the first beacon period, and the communication controller exchanges data with the adjacent communication apparatus.

12. The wireless communication apparatus according to claim 7, wherein the communication controller determines whether or not to accept a connection with the adjacent communication apparatus after receiving the second beacon signal.

13. The wireless communication apparatus according to claim 7, further comprising an application connection unit connecting an application device, wherein, after receiving the second beacon signal, the communication controller determines whether or not to accept a connection with the adjacent communication apparatus based on application attribute information held by the application device.

14. A wireless communication method for performing communication operation in a wireless communication environment where a first beacon period is set at every predetermined period in a first network group and communication apparatuses in the first network group exchange beacon containing information concerning a network so as to form the first network group, the wireless communication method being executed by communication apparatus in the first network group and comprising:

generating, using a beacon generator of the communication apparatus, a temporary beacon and a first beacon signal corresponding to a first beacon of the communication apparatus, the temporary beacon being separate from the first beacon;

setting the first beacon between the communication apparatuses in the first network group;

searching for an adjacent second network group having a second beacon period different from the first beacon period by transmitting the first beacon in a beacon scan performed by a beacon scan unit of the communication apparatus;

attempting to enter the second network group by transmitting the first beacon signal during the first beacon period;

receiving a second beacon signal from a new communication apparatus in the second network group;

authenticating the new communication apparatus to determine a type of connection to be formed between the communication apparatus and the new communication apparatus;

controlling the connection between the new communication apparatus and the communication apparatus based on the first beacon, the second beacon, the temporary beacon, and a result of the authentication;

exchanging data between the communication apparatus having the first beacon period and the new communication apparatus having the second beacon period without merging the first beacon period and the second beacon period into a single beacon period when the type of connection is determined to be an unsecure connection; and exchanging data between the communication apparatus and the new communication apparatus by merging the first beacon period and the second beacon period when the type of connection is determined to be a secure connection.

15. A computer-readable storage medium, comprising a computer program, which when executed on a communication apparatus causes the communication apparatus to perform a communication operation in a wireless communication environment where a first beacon period is set at every predetermined period in a first network group and communication apparatuses in the first network group exchange beacon containing information concerning a network so as to form the first network group, the communication operation comprising:

generating a temporary beacon and a first beacon signal corresponding to a first beacon of the communication apparatus, the temporary beacon being separate from the first beacon;

setting the first beacon between the communication apparatuses in the first network group;

searching for an adjacent second network group having a second beacon period different from the first beacon period by transmitting the first beacon in a beacon scan;

attempting to enter the second network group by transmitting the first beacon signal during the first beacon period;

receiving a second beacon signal from a new communication apparatus in the second network group;

authenticating the new communication apparatus to determine a type of connection to be formed between the communication apparatus and the new communication apparatus;

controlling the connection between the new communication apparatus and the communication apparatus based on the first beacon, the second beacon, the temporary beacon, and a result of the authentication;

exchanging data between the communication apparatus having the first beacon period and the new communication apparatus having the second beacon period without merging the first beacon period and the second beacon period into a single beacon period when the type of connection is determined to be an unsecure connection; and exchanging data between the communication apparatus and the new communication apparatus by merging the first beacon period and the second beacon period when the type of connection is determined to be a secure connection.

* * * * *